(12) United States Patent
Morrow et al.

(10) Patent No.: US 7,549,472 B2
(45) Date of Patent: Jun. 23, 2009

(54) METHOD FOR INCREASING THE PRODUCTION OF HYDROCARBON LIQUIDS AND GASES

(75) Inventors: Norman R. Morrow, Laramie, WY (US); Zhengxin Tong, Laramie, WY (US)

(73) Assignee: University of Wyoming, Laramie, WY (US)

( * ) Notice: Subject to any disclaimer, the term of this patent is extended or adjusted under 35 U.S.C. 154(b) by 412 days.

(21) Appl. No.: 10/593,729

(22) PCT Filed: Mar. 24, 2005

(86) PCT No.: PCT/US2005/009977

§ 371 (c)(1),
(2), (4) Date: Sep. 21, 2006

(87) PCT Pub. No.: WO2005/094552

PCT Pub. Date: Oct. 13, 2005

(65) Prior Publication Data

US 2008/0236845 A1 Oct. 2, 2008

Related U.S. Application Data

(60) Provisional application No. 60/556,717, filed on Mar. 25, 2004.

(51) Int. Cl.
*E21B 43/16* (2006.01)
(52) U.S. Cl. .................. 166/263; 166/279; 166/305.1; 166/372
(58) Field of Classification Search .................. None
See application file for complete search history.

(56) References Cited

U.S. PATENT DOCUMENTS

| 3,970,148 A | | 7/1976 | Jones et al. |
| 4,101,425 A | | 7/1978 | Young et al. |
| 4,510,997 A | * | 4/1985 | Fitch et al. .................. 166/263 |

* cited by examiner

*Primary Examiner*—Zakiya W. Bates
(74) *Attorney, Agent, or Firm*—Emery L. Tracy

(57) ABSTRACT

A method for reducing or eliminating water block around a well bore of a well bore region in a reservoir is provided. The method comprises removing the water from around the well bore, injecting crude oil around the well bore, and injecting precipitants causing surface precipitation of asphaltenes thereby altering formation wettability in the well bore and decreasing capillary forces of retention for water and/or gas condensates and increasing the flow of hydrocarbon fluids from the reservoir.

28 Claims, 13 Drawing Sheets

Fig. 1 Method 1 of treatment for oil reservoir case

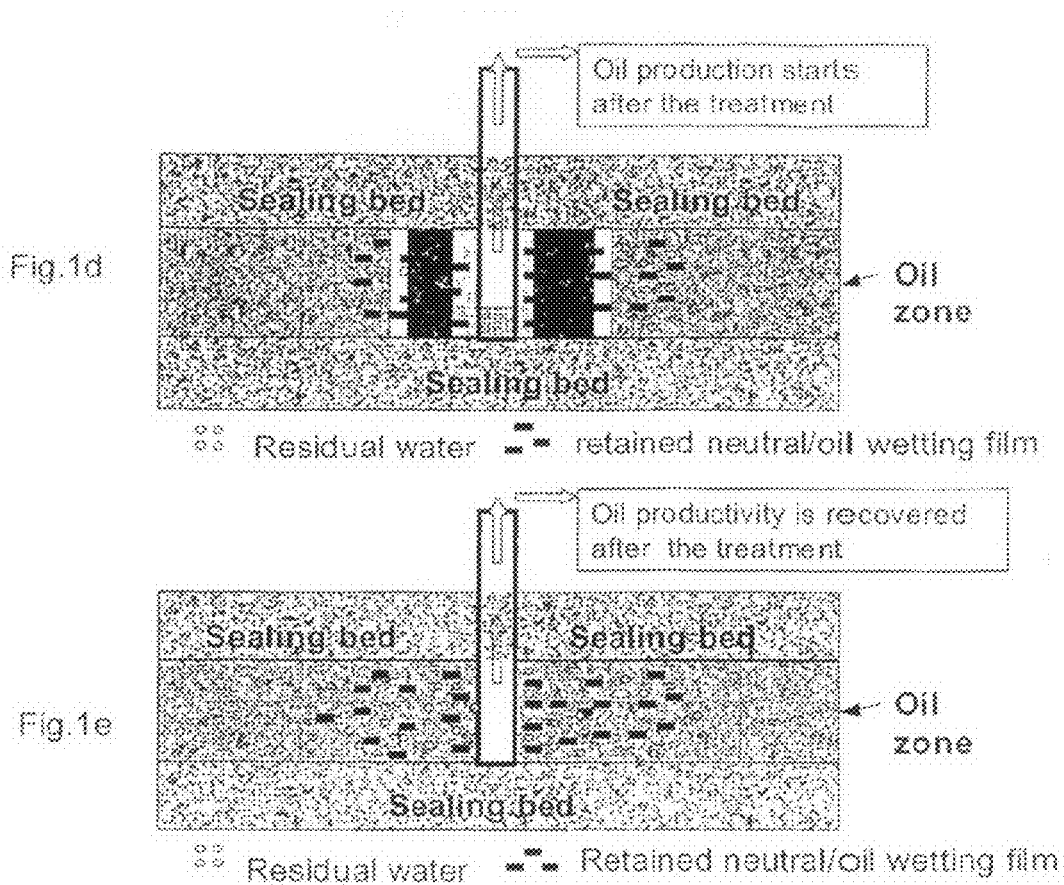
Fig. 1d
Fig. 1e
Fig. 2 The sketch of water saturation change near well bore vs. cycle numbers of treatment
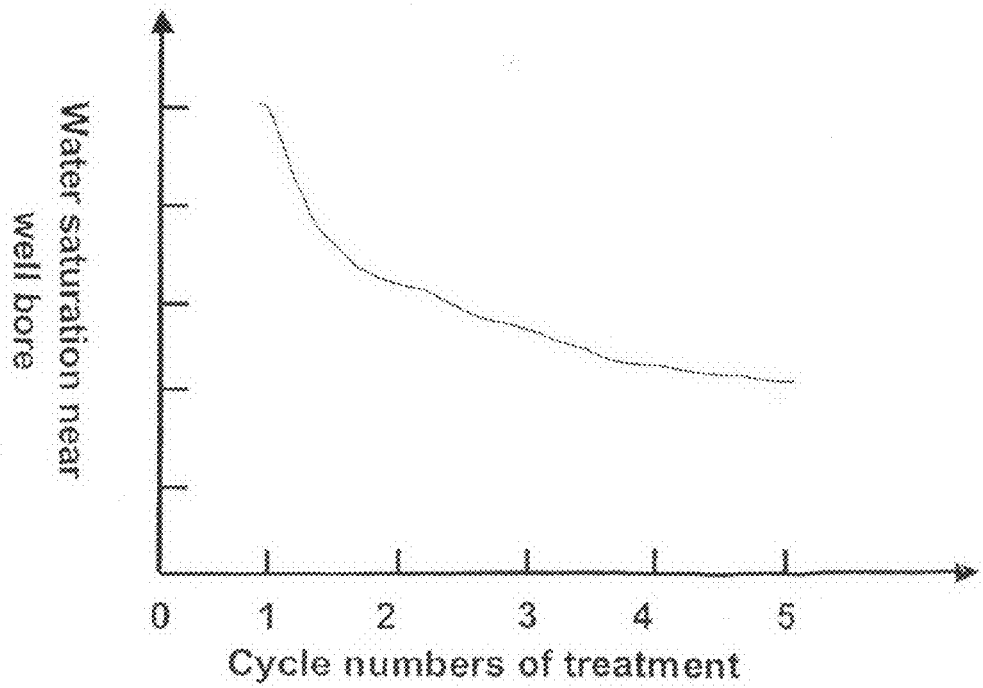

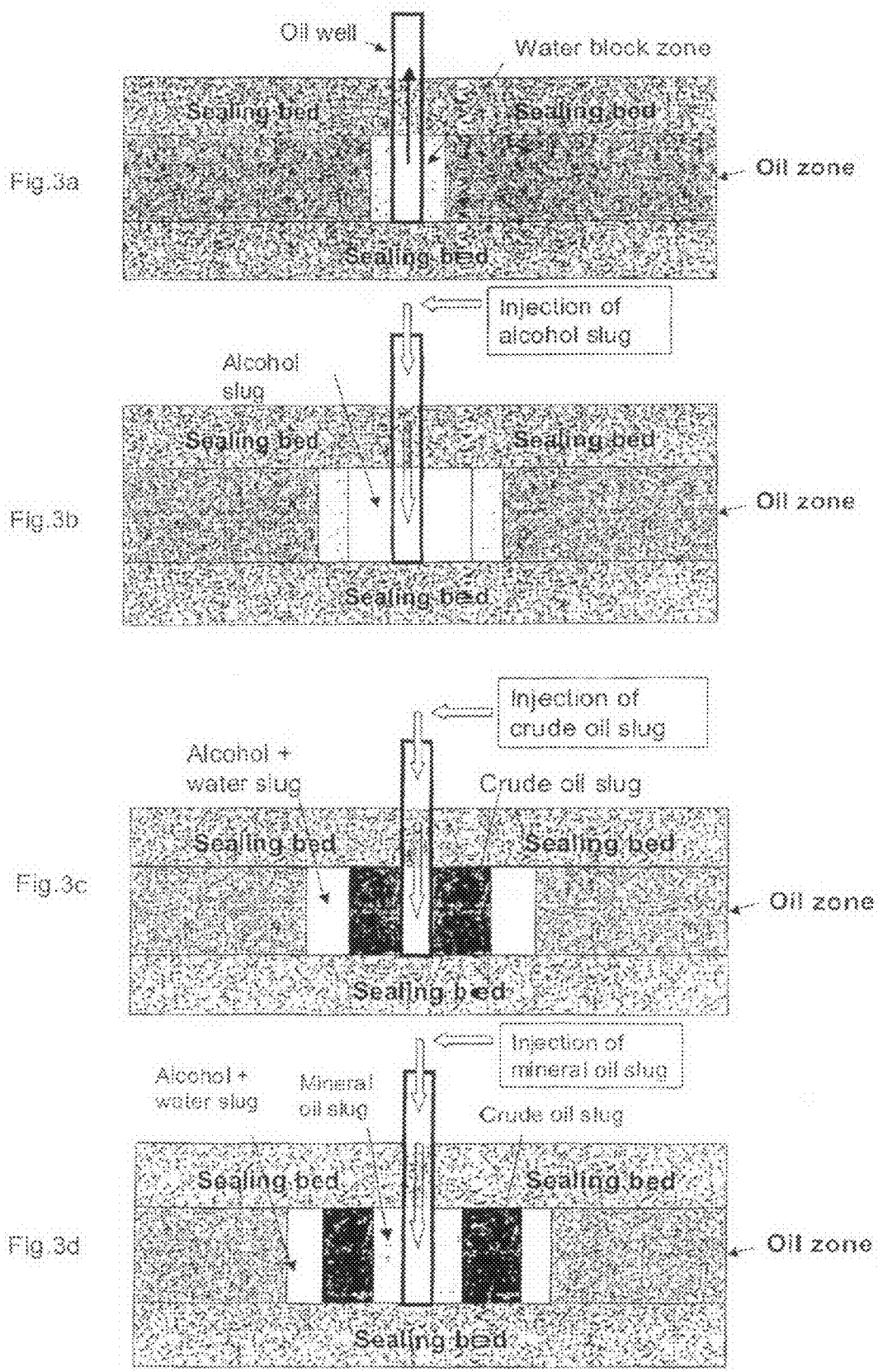

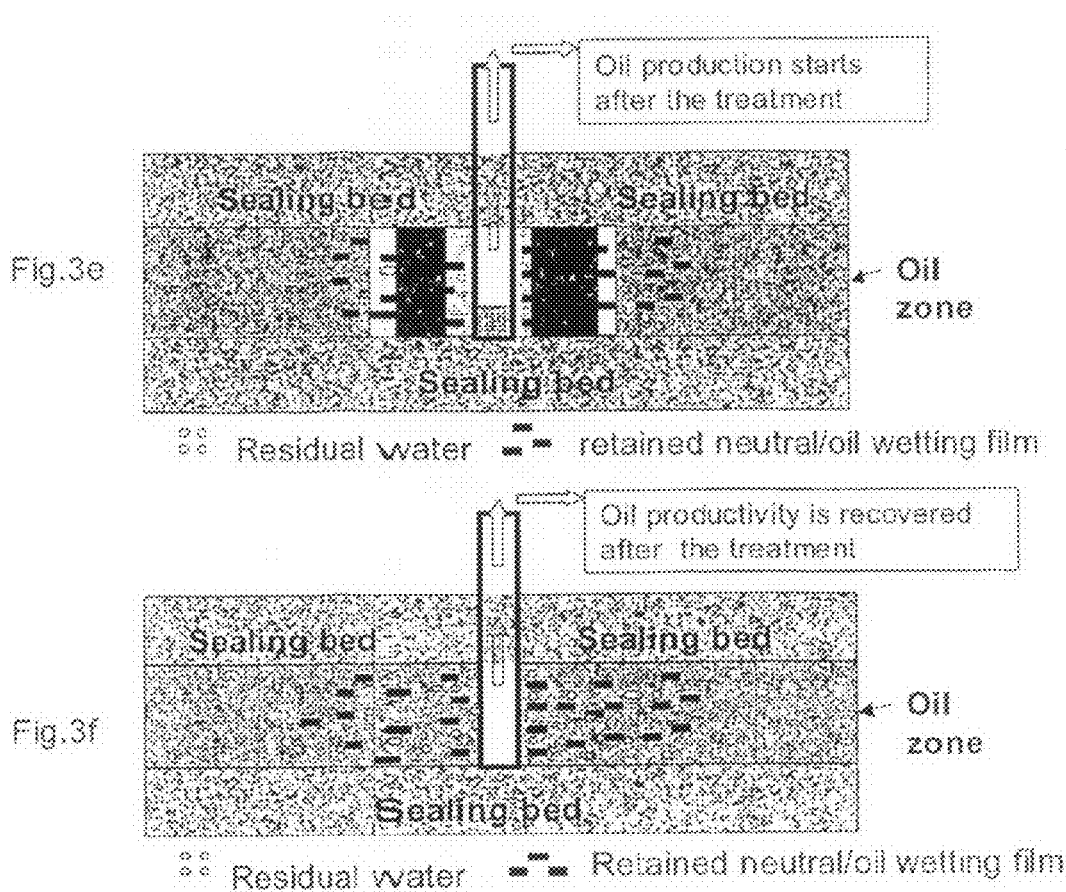
Fig. 4 Method 1 of treatment for gas or gas condensate reservoir case
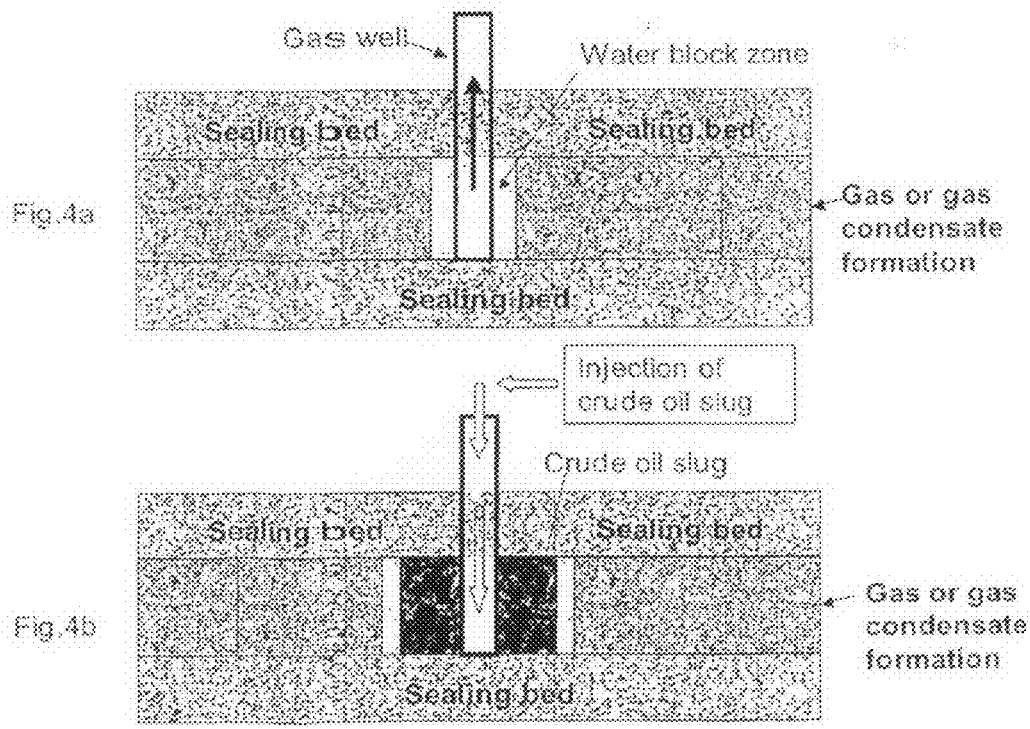

Fig. 5 Method 2 of treatment for gas or gas condensate reservoir case

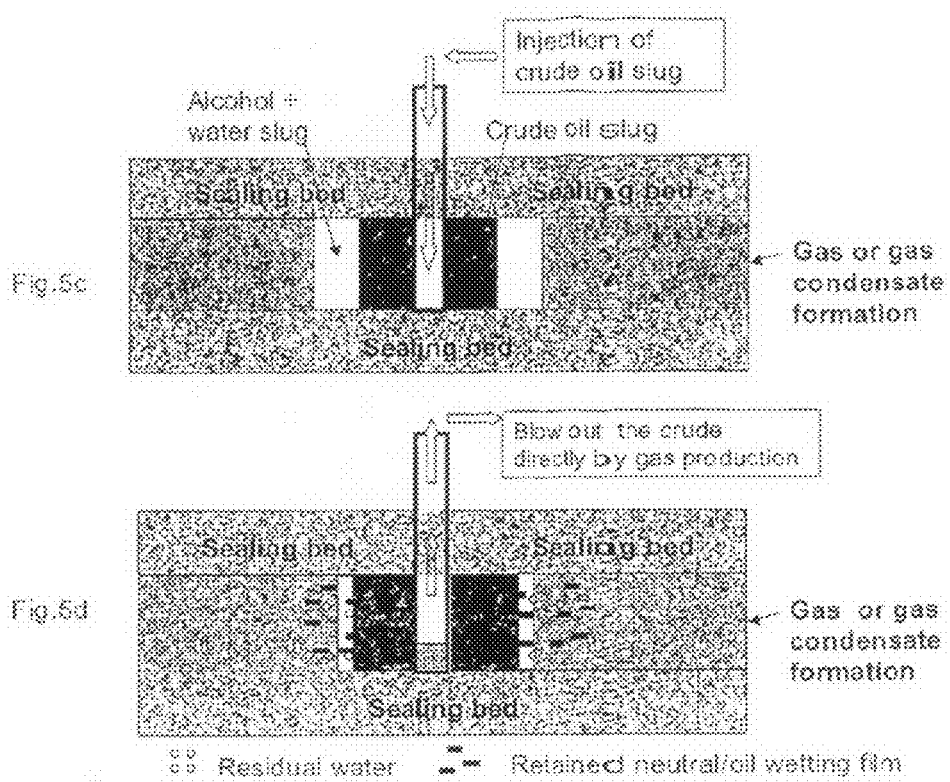
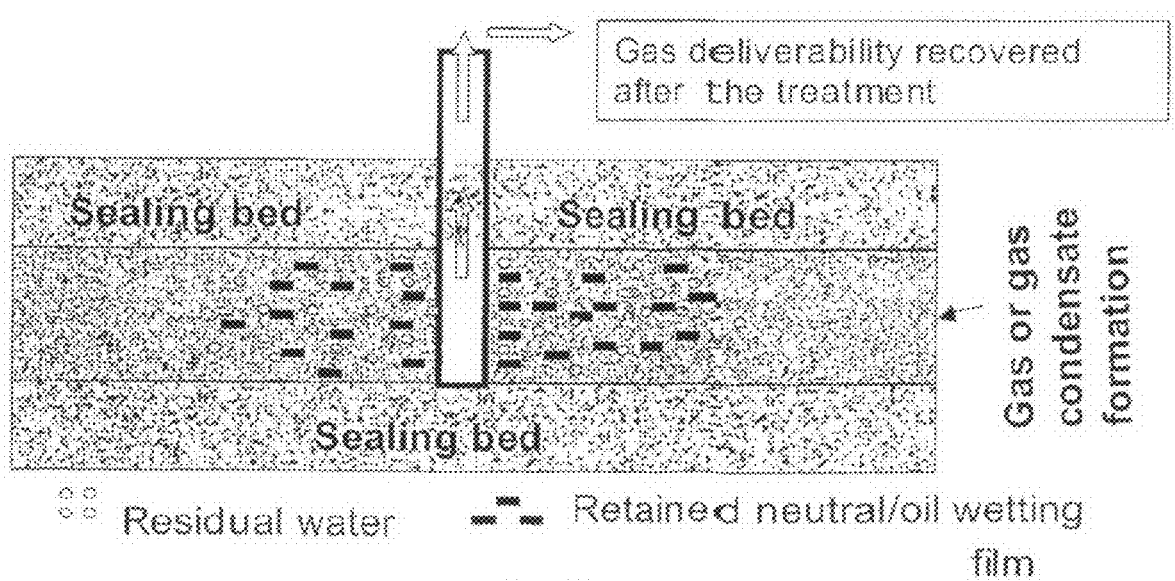
Fig. 5e

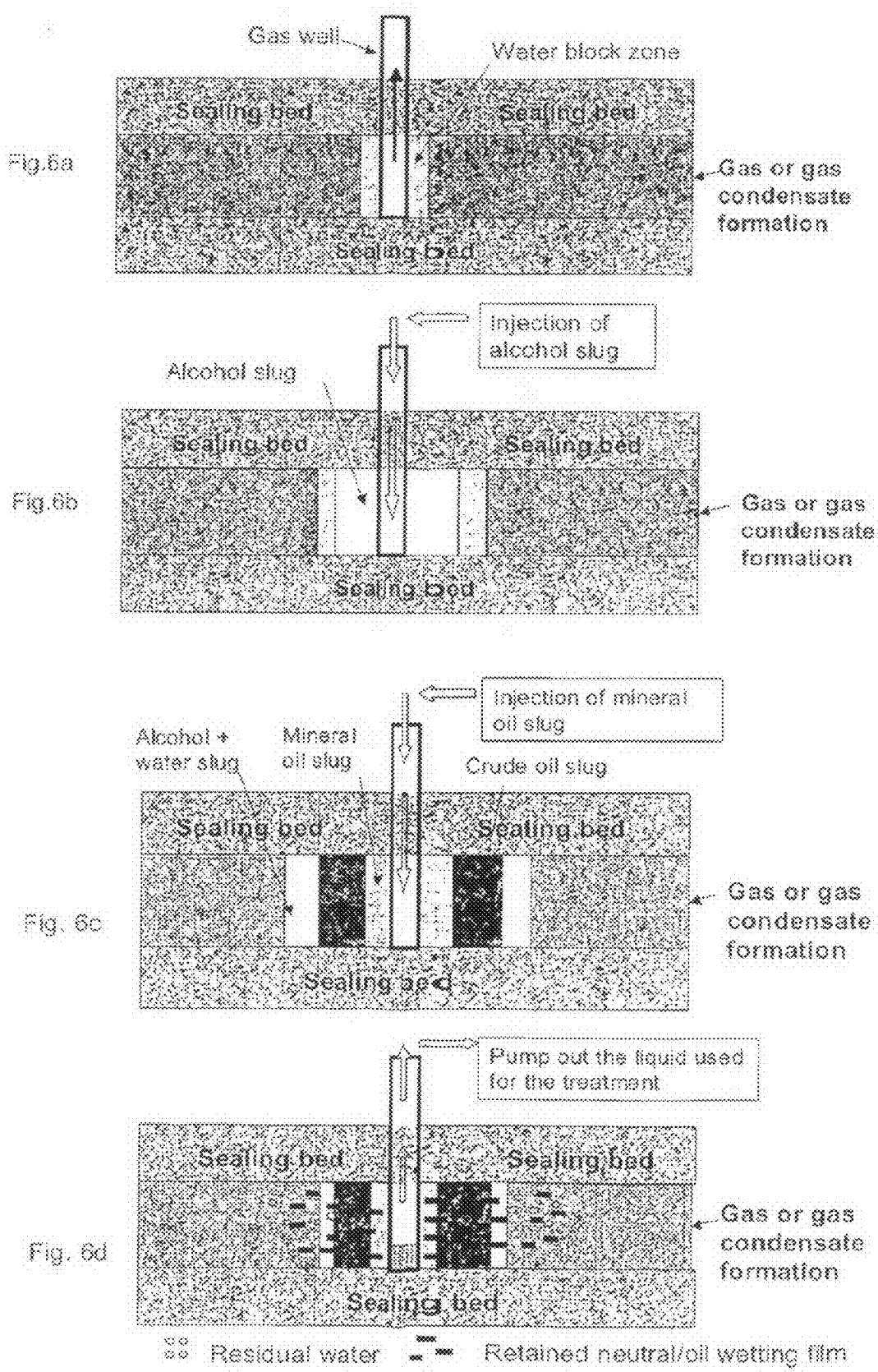

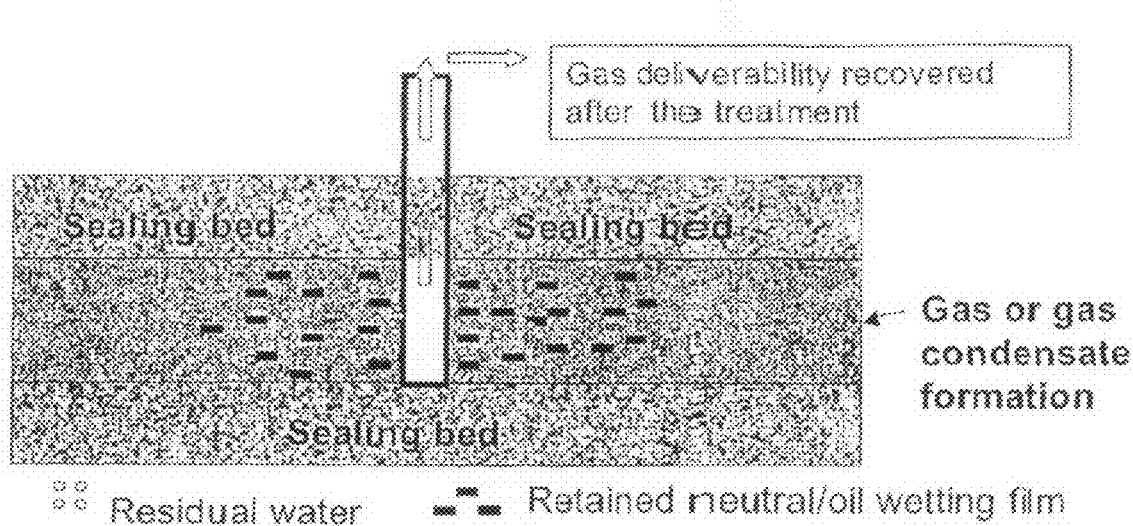
Fig. 6e
Fig. 7 Water coning case
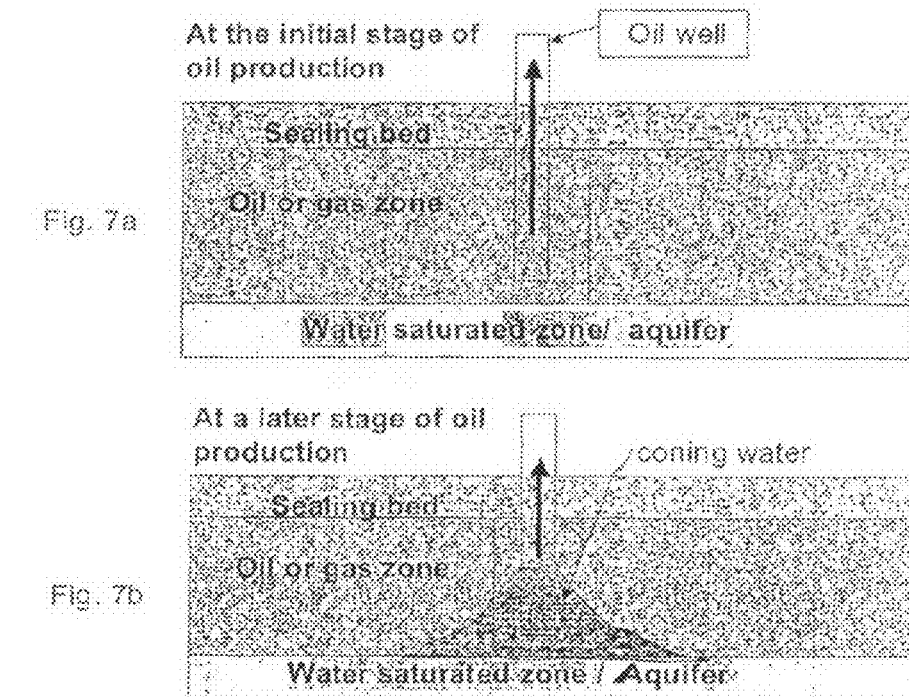

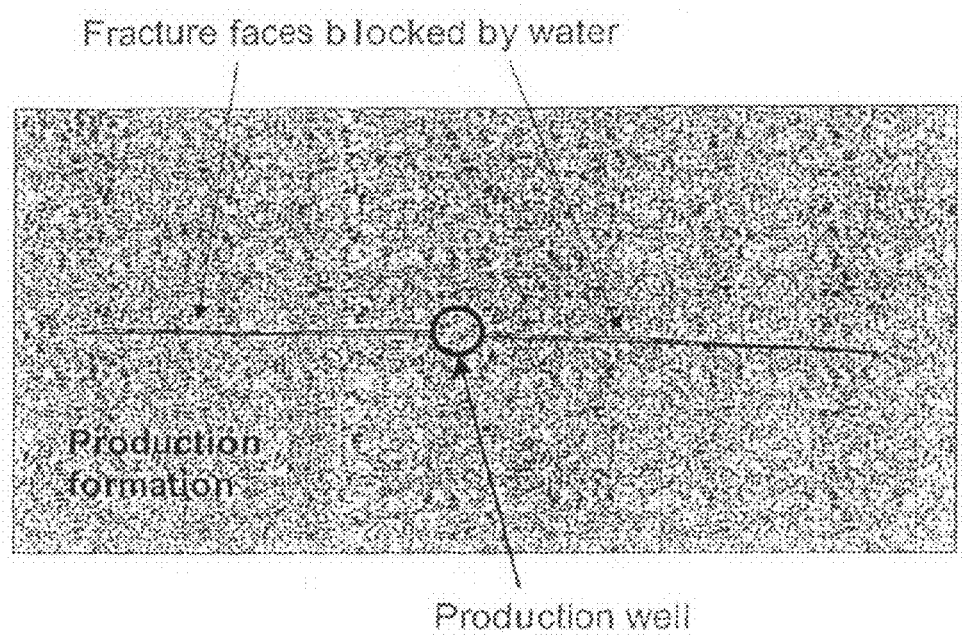
Fig. 8 Case with hydraulic fracture wells—plane view sketch

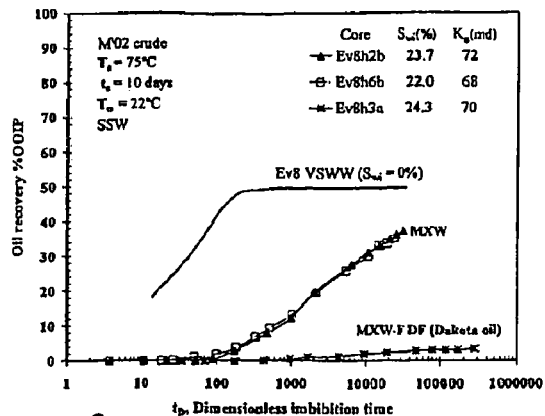

9a. Dakota oil displacing M'02 crude after 10-day aging

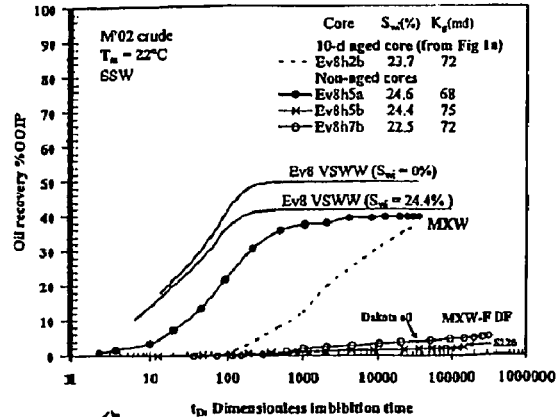

9b Comparison of S220 and Dakota oil displacing M'02 crude without aging

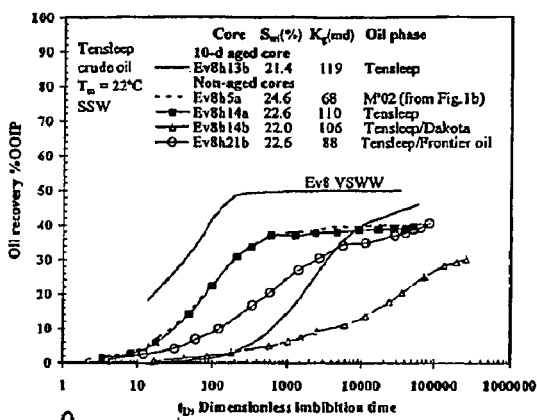

9c Comparison of Dakota and Frontier oil displacing Tensleep crude without aging

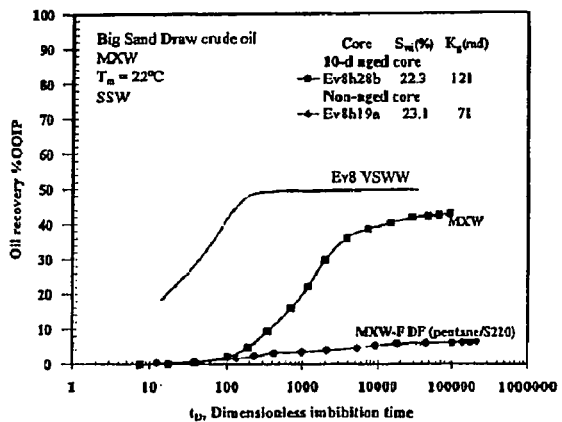

9d Pentane/S220 displacing Big Sand Draw crude without aging

Fig. 9 Wettability alteration was induced by displacement of crude oil with mineral oil or paraffinic oil directly.

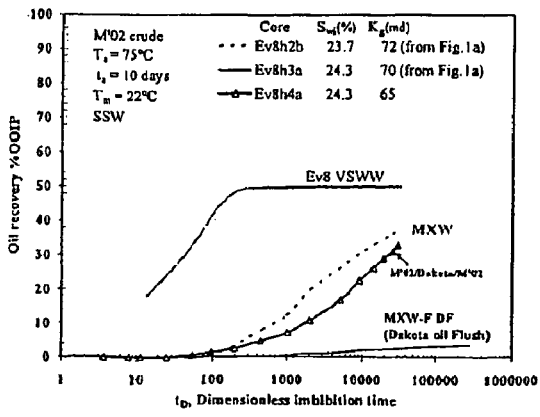

Fig. 10 Re-exposing surface-precipitated asphaltenes to fresh crude oil resulted in increased water wetness.

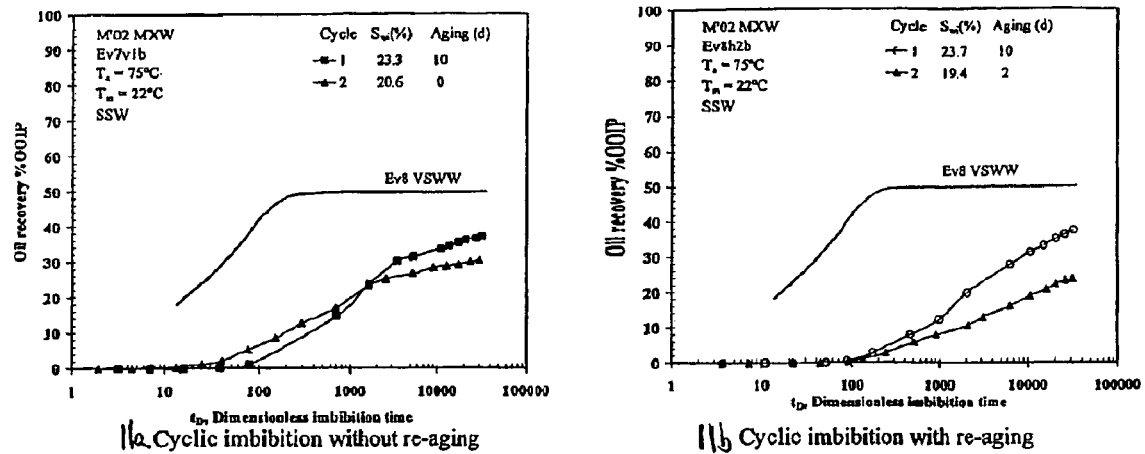
Figure 11. The effect of re-aging on wettability alteration
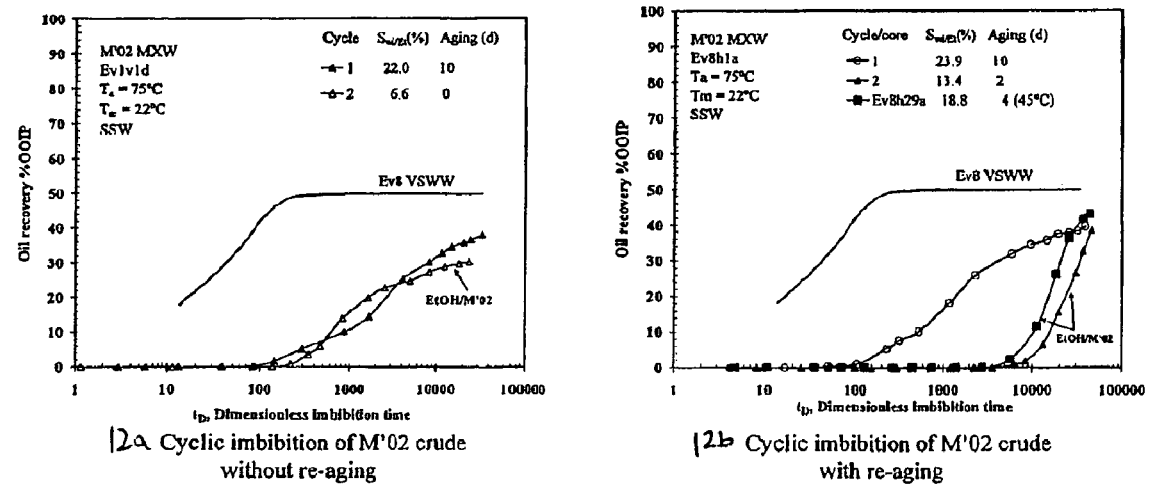
Fig 12. The effect of alcohol flush and re-aging on wettability alteration

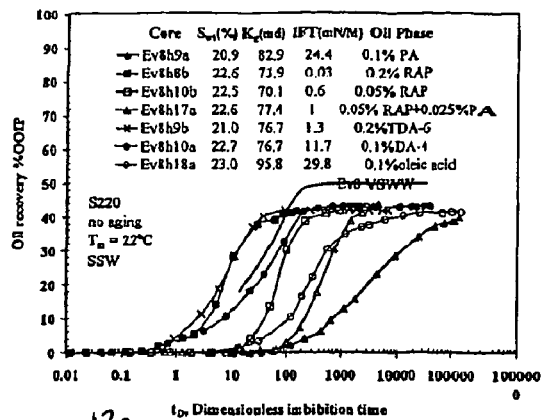

FIG. 13a Screening oil-soluble surfactants

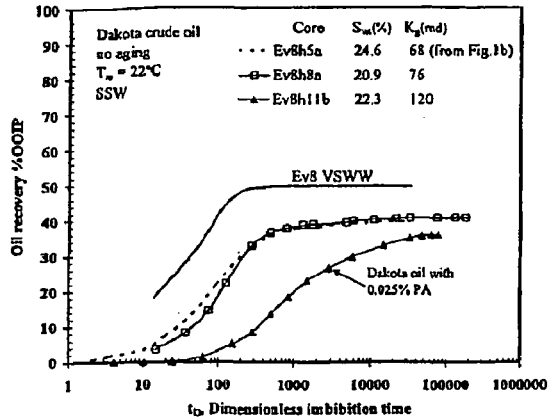

FIG. 13b The effect of PA on oil recovery of Dakota oil

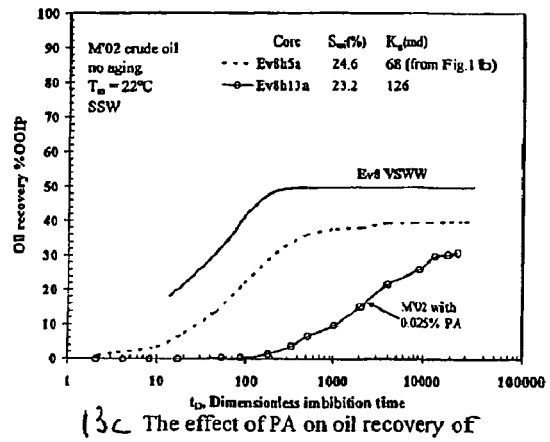

FIG. 13c The effect of PA on oil recovery of M'02 without aging

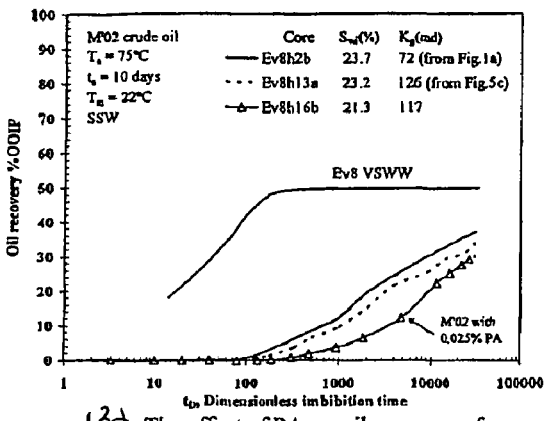

FIG. 13d The effect of PA on oil recovery of M'02 with aging

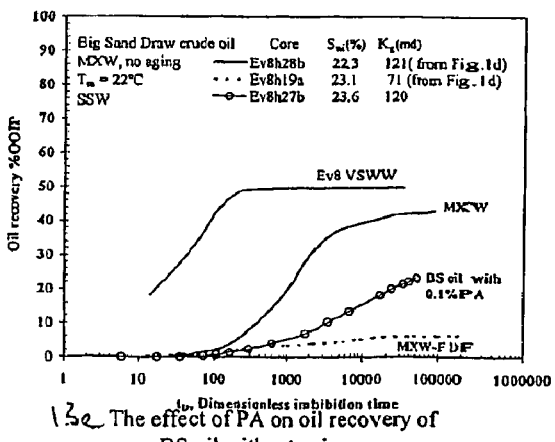

FIG. 13e The effect of PA on oil recovery of BS oil without aging

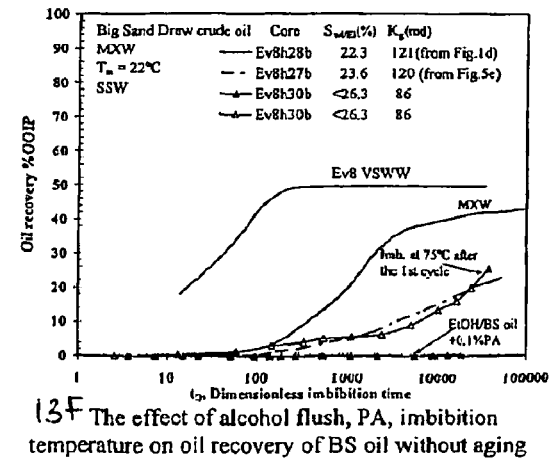

FIG. 13f The effect of alcohol flush, PA, imbibition temperature on oil recovery of BS oil without aging FIG. 13 The effect of alcohol flush, oil-soluble surfactant and re-aging on wettability alteration for Berea sandstones

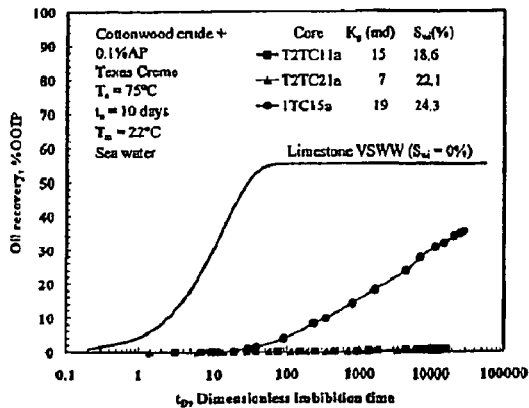

Fig. 14 The effect of Cottonwood crude oil and oil-soluble surfactant on wettability alteration for limestone

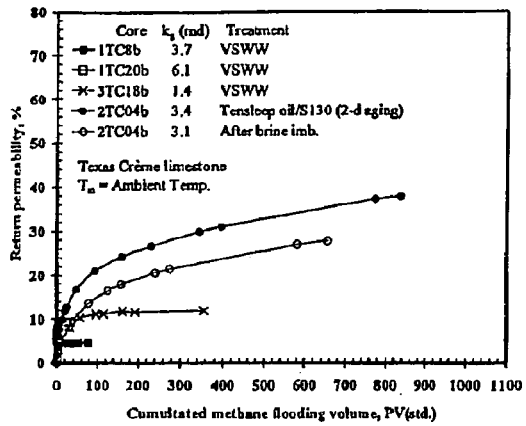

15a. Comparison between VSSW and Wettability induced by Tensleep/S130 with 2-d aging

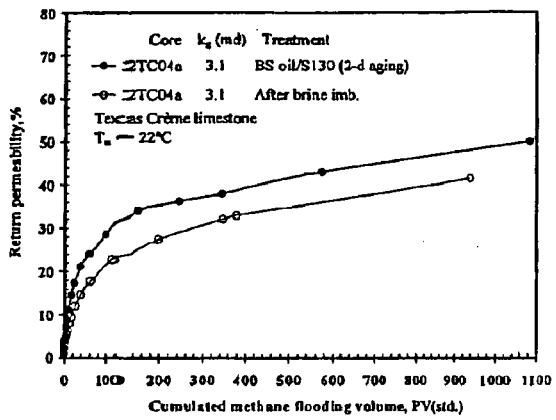

15b. Wettability induced by BS oil/S130 with 2-d aging

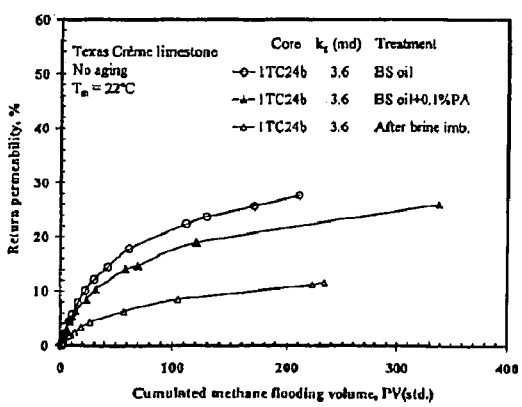

15c. Wettability altered by BS oil or BS oil+0.1%PA without aging

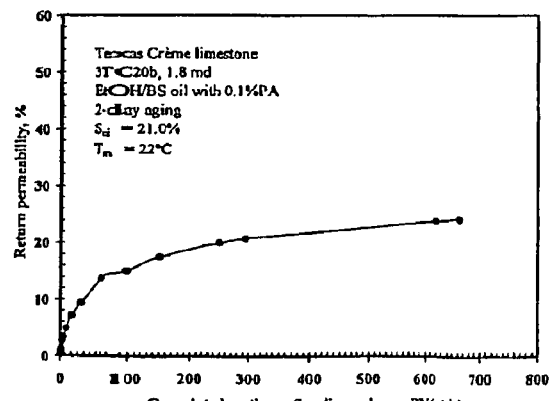

15d. Wettability altered by alcohol flush and BS oil+0.1%PA with 2-d aging

The effect of wettability alteration on gas return permeability

FIG. 15

METHOD FOR INCREASING THE PRODUCTION OF HYDROCARBON LIQUIDS AND GASES

CROSS REFERENCE TO RELATED APPLICATIONS

This application is a 371 of PCT Patent Application No. PCT/US2005/009977, filed Mar. 24, 2005, and claims benefit of U.S. Provisional Application No. 60/556,717, filed Mar. 25, 2004, and provisional patent application Ser. No. 60/617,630, filed Oct. 6, 2004.

BACKGROUND OF THE INVENTION

1. Field of the Invention

This invention relates generally to hydrocarbon exploration and extraction and, more particularly, the invention relates to a method for removing or eliminating water and/or gas condensates blockage in well bores and at the face of hydraulic fractures by using the wetting and related interfacial properties of various oil forms in order to decrease the forces of capillary retention of water and/or gas condensates and thereby increase the efficiency of extraction of hydrocarbons from underground reservoirs.

2. Description of the Prior Art

Accumulation of water around a wellbore, commonly described as water block, is widely recognized as a serious cause of decrease in production of hydrocarbon fluids which include both oil and gas and also liquid hydrocarbon condensates. Water blocking can be defined as the consequence of higher water saturation around the near-well-bore formation compared to the connate water saturation associated with rock that is more distant from the wellbore.

Water blocking can arise from any one or a combination of the following conditions, drilling, completion, fracturing, work over, or casing leaks. Because of the higher water saturation in the rock around the wellbore, the productivity of gas or oil flow is reduced. The presence of high water saturation in the wellbore region greatly increases the transmissibility of water into the well and greatly reduces the transmissibility of oil and/or gas. The effect on transmissibility is expressed through increased relative permeability to water and reduced relative permeability to gas and/or oil. The local change in transmissivity results in drastic suppression of the ability of oil or gas to flow into the well from the surrounding formation.

Even under conditions of flow of both phases or flow of hydrocarbon gas and/or oil, high water saturation is maintained around the well bore because of capillary forces. The problem becomes increasingly serious with decrease in permeability of a formation because pore sizes are smaller and capillary action is stronger.

The problem of water blocking is further accentuated if the well bore region has been subject to clay particle invasion or clay swelling. Dispersion, migration, and plugging by fine particles during well drilling and completion operations results in smaller pore sizes around the well bore. The locally decreased pore sizes result in impaired permeability and exacerbate the problem of water block by capillary retention. Damaged zones are prevalent in the perforation regions where access to the formation through well casing has been established by means of explosive shaped charges which crush the rock. Crushing of the rock in the local region of the perforation results in reduced pore size with attendant reduced permeability and increased capillary retention of water.

The clean up or removal of water blocking is currently difficult, expensive, and time-consuming. One approach to mitigating this problem is to treat the well bore with chemicals that adsorb onto the rock surface to render it near neutral to oil wet. Capillary retention forces are reduced and permeability to hydrocarbon is increased. The chemicals proposed for wettability alteration are expensive. Furthermore they may only be effective for a limited time because they are generally held as a monolayer at the rock surface and the wettability alteration may not be stable over time at the prevailing flow conditions.

Some kind of chemicals can be used to enhance the cleanup of the water block. Alcohol can be used to mitigate water blocking of gas production. The effects of various liquids such as brine, alcohols, and toluene on the gas deliverability have been studied. From this, it has been concluded that the cleanup of water block near a well bore could be divided into two stages. The first stage was fluid displacement which bypassed water and left high-retained water saturation around the well bore. This stage lasted about two days. The second stage was reduction of water saturation by evaporation driven by gas flow (mass transfer of water into the gas phase as the gas expands during flow into the well bore). The second stage could last for several months. The addition of volatile solvent helped the remediation in the second stage and reduced the duration of the cleanup.

It has also been found that the addition of methanol could speed the cleanup of water blocking. Wettability change from water wet to oil wet through using 1% v/v solution of octyl-decyltrichlorosilane (OTS) could also aid in the clean up of water blocking in limestone when methanol was used to displace the water block. They mentioned that surfactants which change wettability might be used to enhance clean up of water blocks in tight gas sands.

However, if the draw down pressure were much higher than the capillary pressure of the near-well bore formation, the water block would be removed. Under these conditions there was not much benefit to well treatment with alcohol or alcohol/surfactant to remove water block.

Others have concluded that change in wettability of the rock surface from water wet to oil wet would promote mitigation of water blocks because the capillary pressure and hence capillary retention of water was reduced. Non-emulsifiers (surfactants) dissolved in methanol were employed to induce wetting change from water-wet to non-wet (contact angle ~90°).

Others have claimed that oil-based mud filtrate, which contained asphalt that was soluble in crude oil or aromatic solvent, significantly increased gas well deliverability and oil or condensate productivity compared to water-based fluids.

SUMMARY

The present invention is a method for reducing or eliminating water block around a well bore of a well bore region in a reservoir. The method comprises removing the water from around the well bore, injecting crude oil around the well bore, and injecting precipitants causing surface precipitation of asphaltenes thereby altering formation wettability in the well bore and decreasing capillary forces of retention for water and/or gas condensates and increasing the flow of hydrocarbon fluids from the reservoir.

BRIEF DESCRIPTION OF THE DRAWINGS

FIGS. 1a-1e illustrate a method of treatment for oil reservoirs, in accordance with the present invention;

FIG. 2 is a graph illustrating water saturation change near well bore versus cycle numbers of treatment;

FIGS. 3a-3f illustrate another method of treatment for oil reservoirs, in accordance with the present invention;

FIGS. 4a-4d illustrate a method of treatment for gas or gas condensate reservoirs, in accordance with the present invention;

FIGS. 5a-5e illustrate another method of treatment for gas or gas condensate reservoirs, in accordance with the present invention;

FIGS. 6a-6e illustrate yet another method of treatment for gas or gas condensate reservoirs, in accordance with the present invention;

FIGS. 7a and 7b illustrate water coning cases at the initial stage of oil production and at a later stage of oil production;

FIG. 8 illustrates a hydraulic fracture well;

FIGS. 9a-9d are graphs illustrating wettability alteration induced by displacement of crude oil with mineral oil or paraffinic oil directly;

FIG. 10 is a graph illustrating re-exposing surface-precipitated asphaltenes to fresh crude oil resulting in increased water wetness;

FIGS. 11a and 11b are graphs illustrating the effect of re-aging on wettability alteration;

FIGS. 12a-12c are graphs illustrating the effect of alcohol flush and re-aging on wettability alteration;

FIGS. 13a-13f are graphs illustrating the effect of alcohol flush, oil-soluble surfactant, and re-aging on wettability alteration for Berea sandstones;

FIG. 14 is a graph illustrating the effect of Cottonwood crude oil and oil-soluble surfactant on wettability alteration for limestone; and FIGS. 15a-15d are graphs illustrating the effect of wettability alteration on gas return permeability.

DETAILED DESCRIPTION OF THE PREFERRED EMBODIMENTS

Figure 1A:
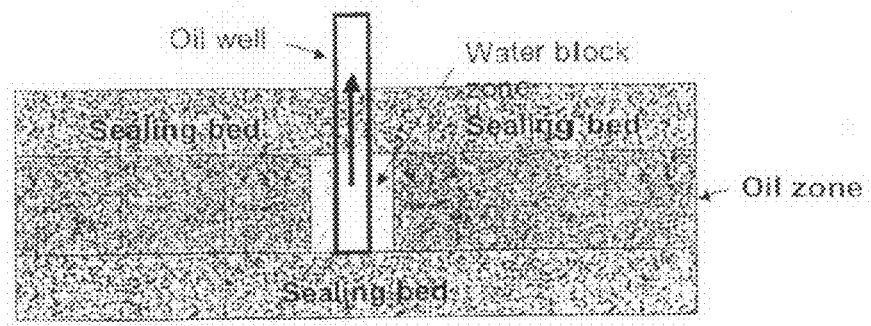
Figure 1B:
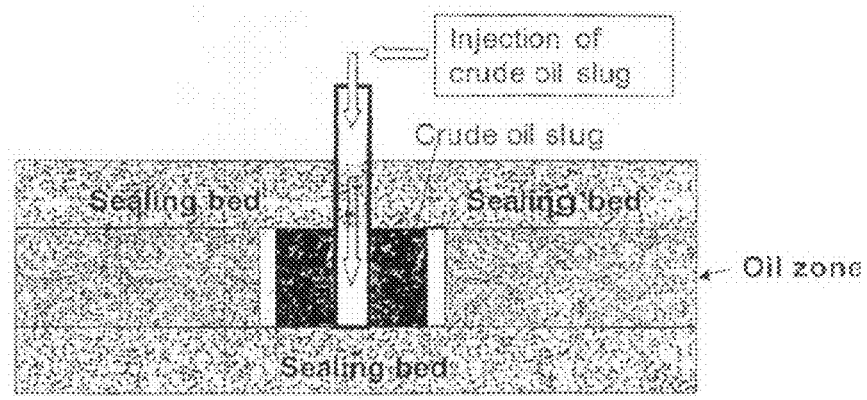
Figure 1C:
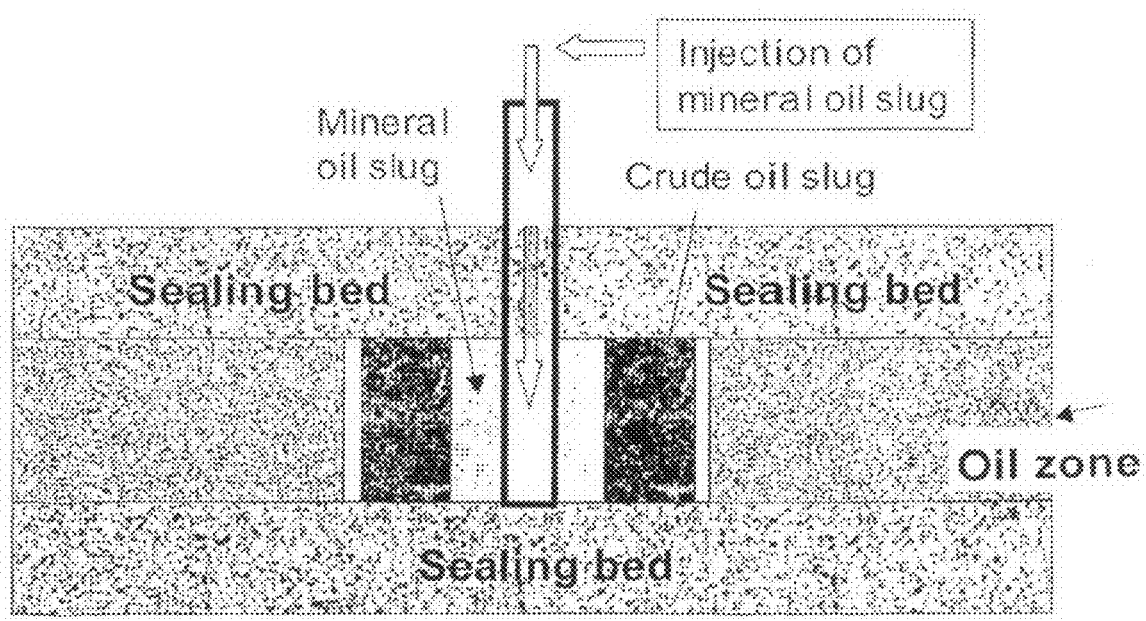
Figure 4C:
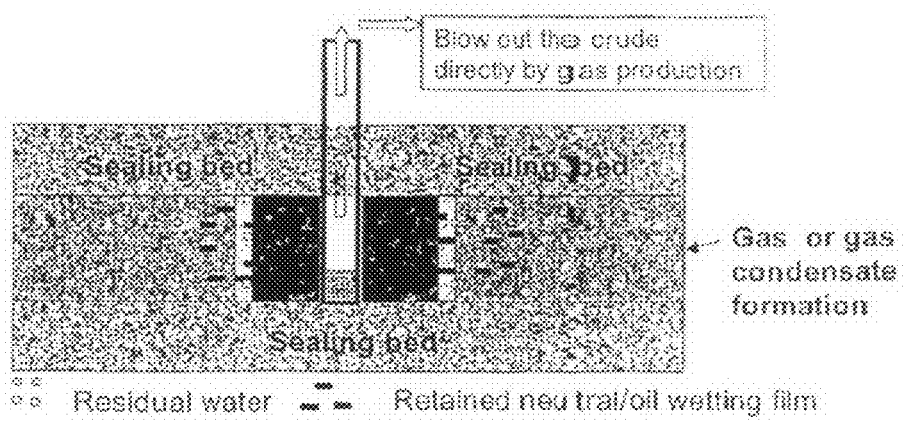
Figure 4D:
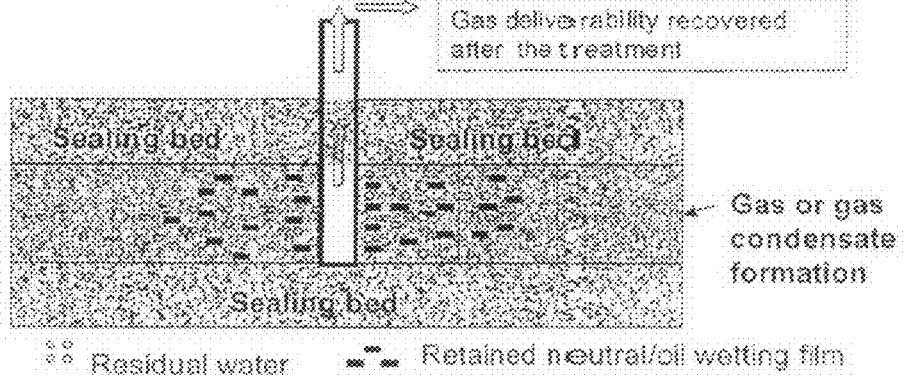

In one of many possible embodiments, the present invention provides a method for reducing or eliminating water block by removing the water from around a well bore, injecting crude oil, surface precipitating of asphaltenes in the well bore region by injecting aliphatic hydrocarbons or other hydrocarbon fluids of low solvency for asphaltenes, decreasing the wettability to water of mineral surfaces within the water block and well bore to near neutral to oil wet by removing the water, injecting crude oil, and surface precipitating of asphaltenes thereby decreasing capillary retention forces of water, or water and/or condensates from gases and increasing the flow of hydrocarbon liquids or gases from the reservoir.

When the wettability of a rock is altered by adsorption from crude oil, the initial water content of the rock at the time of adsorption had a dominant effect on the reduction in capillary forces as determined by measurement of rate and extent of spontaneous imbibitions. The lower the initial water saturation, the greater the reduction in water-wetness of the rock surface. The wettability induced by the adsorption of organic film from asphaltic crude oils in the presence of connate water were stable to many cycles of exposure to oil and water.

Furthermore, the water saturation in the rock could be readily reduced by flow of oil after the first cycle of treatment, so that low water saturations, a key factor in reduction of wettability to water, would pertain if the rock is re-exposed to crude oil. The extent of wettability alteration depended on how crude oil was displaced from the rock by some other oleic phase.

Direct displacement of crude oil by a hydrocarbon with low solvency for the asphaltenes in crude oil resulted in the most pronounced wettability change for both sandstone and carbonate rocks without significant reduction in permeability. The low solvency hydrocarbon typically has significantly lower refractive index than the crude oil. The low solvency hydrocarbon and hydrocarbon gas will hereafter be referred to as aliphatic mineral oil (or more briefly as mineral oil-carbon chain number equal to and greater than about five) and gas (carbon chain number less than about five). The change in wettability is ascribed principally to the surface precipitation of asphaltenes from the crude oil, a wettability alteration mechanism. Surface precipitation results from incompatibility of the crude oil and the mineral oil with respect to the solvency of asphaltenes contained in the crude oil.

Comparable incompatibility and deposition of asphaltenes can result from exposure of crude oil to hydrocarbon gas or gas condensate. Precipitation of asphaltenes causes formation damage. However, according to the hydrocarbon production scenario, wettability alteration by adsorption and/or surface precipitation from crude oil can be effected by injection of crude oil with essentially no damage to the formation. Greater wettability alteration by surface precipitation can be effected by following injection of an oleic or gas phase which induces asphaltene precipitation from the crude oil. Alternatively the gas or gas condensate of the reservoir can facilitate the surface precipitation of asphaltenes.

The lower the water content at the time of treatment, the more effective is the change in wettability. Water saturation could be lowered by injection of a viscous crude oil to increase the effectiveness of wettability alteration by adsorption from the crude oil or by surface precipitation as already described. Different procedures can be employed to reduce high water saturation in the vicinity of a well bore. Enough liquid should be injected so that the distance from the well bore would usually be in the range of about two to about ten feet from the well bore but is not necessarily restricted to this range.

As illustrated in FIGS. 1a-1e, the first method of the present invention is direct injection of the crude oil followed by a slug of alkane (usually a mineral oil) to induce wettability alteration towards near neutral to oil wet by surface precipitation from crude oil (see FIGS. 1a-1e for the steps in removal of water block and restoration of oil production). If additional removal of water is needed the treatment cycle can be repeated. It has been observed that after adsorption from crude oil, the water saturation is more readily decreased. An estimate of observed relationships between treatment cycle and water saturation is presented in FIG. 2.

As illustrated in FIGS. 3a-3f, a large decrease in water saturation around the well bore can be achieved by pre-injection of a slug of a co-solvent of water followed by crude oil. After that, a slug of mineral oil (see, FIG. 3d) is used to induce wettability alteration. The co-solvent of water can be a water-soluble alcohol (e.g. methanol), or an alcohol that is conditionally miscible with both oil and water such as iso-propanol or butanol, or a solvent such as tetrahydrofuran that is miscible with both oil and water.

Accumulation of condensate at the well bore is a serious problem in many gas condensate reservoirs. In many instances, accumulation of water around the well bore will also contribute to the local severe reduction in gas permeability. Combinations of water, gas, and condensate lenses to give blockage by a form capillary resistance known as the Jamin effect would be particularly adverse to production. The retention of water could be mitigated by the treatments described below by which water saturation is reduced and the region around the well bore is rendered near neutral to gas condensate wet.

An approach to reduction of water block for gas or gas condensate reservoirs by injection of crude oil is illustrated in FIGS. 4a-4d. Surface precipitation of crude oil is induced by production of gas (or gas plus condensate).

Figure 5A:
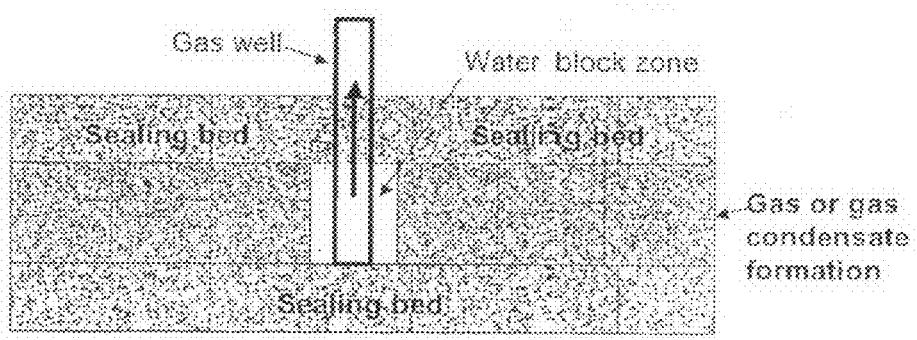

As illustrated in FIGS. 5a-5e, more effective removal of water can be achieved by injection of a co-solvent of water prior to injection of crude oil. Production of gas (or gas plus condensate) is used to induce surface precipitation from the crude oil, as illustrated in FIG. 5d, and to remove water and crude oil from the well bore region so that well productivity is increased, as illustrated in FIG. 5e).

Figure 5B:
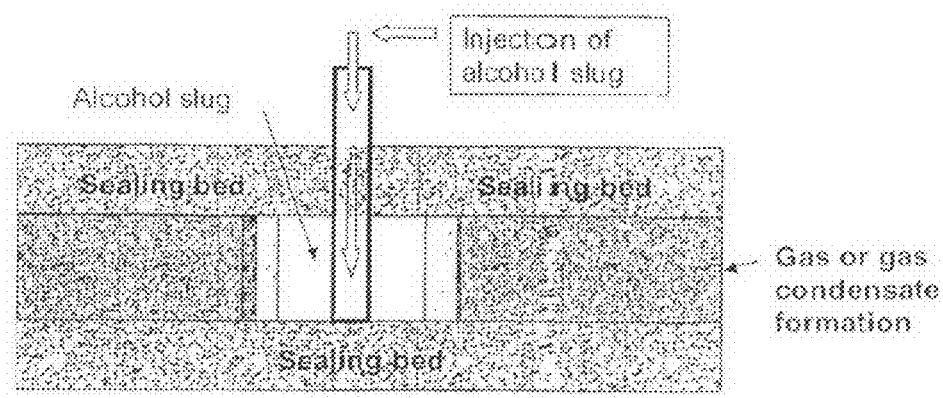

In a third approach to removal of water block in gas and gas condensate wells illustrated in FIGS. 6a-6e, the first three steps are the same as illustrated in FIGS. 5a, 5b, and 5c, but then surface precipitation is induced by injection of mineral oil (FIG. 6c). The liquids used to induce wettability change are then pumped off or forced from the well bore region by gas production.

Another form of water block is commonly referred to as coning. Coning arises because the hydrocarbon zone overlies an aquifer, as illustrated in FIGS. 7a and 7b. The proposed treatments for oil, gas, and gas condensate reservoirs can be used in accordance with the nature of the hydrocarbon zone to increase the permeability of hydrocarbon relative to water around the well bore and so give a higher ratio of hydrocarbon to brine production.

In some cases, very low concentration of surfactants such as amine can be added in the crude oil or alcohols to aid wettability change towards decreased water wetness. In all examples of wettability alteration, when a well is produced, the water block does not re-form because the induced wettability change greatly reduces the forces of capillary retention which act around the well bore. It has been shown that oil recovery by water flooding was maximized at very weakly water-wet conditions. In addition, change in the rock surface wettability towards near neutral wet conditions enhances relative permeability with respect to multiphase flow including the possibility of simultaneous flows of gas, oil, and brine.

Water block is also a serious problem with respect to production from hydraulically fractured wells. The fracture is basically an enlargement of the drainage region of the well bore, as illustrated in FIG. 8). Fracture faces are commonly blocked either by invasion of water associated with the fracturing procedure or by formation water. The procedures based on wettability alteration by adsorption and/or surface precipitation from crude oil described above to remove water block from around a well bore also apply to mitigation of water blocks at fracture faces. Additionally the crude oil can be used as the propant liquid followed by a surface precipitant (usually mineral oil) prior to clean up.

In addition, decreasing the water wetness of mineral surfaces in the well bore region can be achieved by using water-based muds designed to avoid the disadvantage of polymer components which cause wettability change of the mineral surfaces in the well bore region towards increased water wetness.

Based on these observations, it is claimed that reduction of water saturation followed by treatment of rock through adsorption and/or surface precipitation from crude oil which may be coupled with injection of chemicals, such as alkanes, or production of natural gas, to induce surface precipitation of asphaltenes, is a low cost method of reducing or eliminating water block at well bores.

In summary, the specifically described method of the present invention claims that the local water saturation can be reduced by injection of crude oil and by multiple injections of crude oil—for more effective wettability alteration. Injection of a co-solvent can also be used to reduce water saturation prior to exposure to crude oil. Robust wettability alteration by surface precipitation from crude oil can be induced by displacing the crude oil with aliphatic oil such as a mineral oil or a paraffinic crude oil or by exposing the crude oil to reservoir natural gas or gas plus condensate through production. A mutually soluble hydrocarbon to oil and water, such as a longer hydrocarbon chain alcohol such as butanol, can also serve as a precipitant. Very low concentration of surfactants such as amine can be added in the crude oil or alcohols to aid wettability change towards decreased wetness.

The wettability can range from very weakly water wet through neutral to oil wet as indicated by spontaneous imbibitions of either brine or oil. The described treatments for improved hydrocarbon liquid and gas productivity have application to perforated regions, open holes, and to the faces of hydraulic fractures.

Experimental Materials and Procedures

Cores

In the present application, two types of outcrop cores including Berea sandstones and Texas Créme limestones were investigated. The sandstone cores, about 3.8 cm in diameter and 7.6 cm length, were all cut from 'Ev8' block (12"× 12"×6") of Berea sandstone, except three cores from 'Ev1', 'Ev5', and 'Ev7' blocks. Air permeabilities ranged from 65 to 133 md; porosities were within 16.9±1% (see Table 1). The limestone cores, of comparable dimensions to the sandstones, were cut from '1TC' block except that two cores were from 2TC and 3TC blocks respectively. Air permeabilities ranged from 1 to 6 md, and porosities from 18.0% to 22.8 (see Table 2).

Oils

Crude oils ranging from highly asphaltic to paraffinic oils were tested. The asphaltic crudes comprised 5 oils: Minnelusa 2002 (M'02), Cottonwood creek, Black Mountain, Tensleep 1995 (Tensleep95), and Big Sand Draw (BSD.). The paraffinic oils were Dakota and Frontier. All of the crude oils are from Wyoming reservoirs. Asphaltene content, viscosities, and densities of the crude oils are listed in Table 3.

Three mineral oils were also used in the present application; viscous mineral oil (VMO), Soltrol 130®, and Soltrol 220®. VMO has the viscosity of about 1.76 cP. Soltrol 130® and Soltrol 220® are refined mineral oils composed of $C_{10}$-$C_{13}$ and $C_{13}$-$C_{16}$ iso-alkanes, with viscosities of 1.6 cP and 3.8 cP, respectively. In one case, pentane was used in flooding to simulate natural gas. For gas flooding methane with 99% purity was employed.

Brine

Simulated sea water (SSW) was used in the imbibition and flooding tests. 0.10 g/L $NaN_3$ was added as a biocide to suppress bacterial growth. The SSW composition is shown in Table 4.

Surfactants

Three kinds of surfactants were investigated: anionic such as oleic acid; nonionic such as alcohol ethoxylate, DA-4 and DA-6; and polyamines such as PA and RAP.

Interfacial Tension Between Oleic and Aqueous Phases

The densities of both oleic and aqueous phases were measured with a DMA-48 Parr densitometer. The upper operating limit of the densitometer is 60° C. Above this temperature, densities were obtained through extrapolation. The interfacial tension (IFT) between oleic and aqueous phases was measured by using Kruss DVT-10 drop volume tensiometer. For the measurement of IFT at elevated temperature, a temperature control bath was employed. The IFTs of different oil/brine combinations are shown in Table 5.

Establishment of Initial Water Saturations and Core Aging

Before the establishment of initial water saturation, core samples were first saturated with SSW by evacuation and then soaked in the SSW for at least 10 days to obtain ionic equilibrium. Then, initial water saturations were established by displacing brine with viscous mineral oil (VMO). Afterwards, if the target wettability was very strongly water wet (VSWW), the VMO was displaced by S130 or S220; if the target wetness was mixed-wet, the VMO was displaced by 5 PV decalin followed by 5 PV of crude oil. The VMO floods were performed at 0.15 to 0.50 ml/min (about 0.6 to 2 PV/hr). Rates of 0.20 to 0.50 ml/min were used for the subsequent decalin and crude oil displacements.

In some cases, the original brine was first flushed with alcohol, and then the alcohol was displaced by crude oil to establish an initial alcohol saturation, $S_{alc\ i}$.

After the initial water or alcohol saturation had been established by crude oil flooding, most of the cores were submerged in the crude oil, hereafter referred to as the parent crude oil, and aged in a sealed pressure vessel for 1 to 10 days at 75° C. ($T_a$). These cores are referred to as mixed wet (MXW). If the crude oil is displaced by an intermediate solvent, decalin, followed by mineral oil, the core is referred to as mixed wettability (film) (MXW-F). If the crude oil in a core is displaced directly by a mineral oil or paraffinic oil, the core is referred to as MXW-F direct flooding (DF).

Imbibition Tests

Initial Imbibition. The prepared core samples were placed in glass imbibition cells filled with SSW. Oil volume produced by brine imbibition (expressed as percentage of original oil in place (% OOIP)) was recorded against time. The imbibition tests were conducted at ambient temperature unless otherwise stated.

Subsequent Imbibition. At the end of the imbibition, initial water saturation of an MXW core was re-established by crude oil displacement. In some tests, a core was first flushed with alcohol, and the initial alcohol saturation, $S_{alc\ i}$, was then attained by crude oil displacing the alcohol. In some cases, the core with re-established $S_{wi}$ or $S_{alci}$ was next re-aged for 2 days at 45° C. or 75° C. Thereafter, the second cycle of brine imbibition was started.

Gas Flooding

Cores prepared with different wetting states were mounted in a core holder and flooded with methane in order to mimic the effect of water blockage in a gas well. First, as a reference, methane flooding of VSWW cores was evaluated. Then, methane flooding of MXW or MXW-F DF cores was conducted to assess the effect of wettability alteration on water block. A rotameter or mass flow meter was employed to monitor the injected volume of gas. A soap bubble meter was used to measure the gas flow rate. Change of pressure drop across the two ends of a core during the gas flooding was measured with a differential pressure transducer. A series of transient gas permeabilities (flow of gas was accompanied by very slow production of water) were calculated based on Darcy's Law. After the $1^{st}$ cycle of gas flooding, cores were immediately immersed in brine to simulate the water invasion into a treated formation. Increase in saturation by imbibition was monitored gravimetrically. After imbibition of brine had become extremely slow (after about 2-3 days), cores were remounted in the core holder to determine changes in recovered permeability for a second cycle of gas flooding.

Results and Discussion

In order to evaluate the effect of wettability alteration on water blockage based on brine imbibition behavior, a semi-empirical scaling group was employed to account for the effect of rock properties, boundary conditions, viscosities, and interfacial tension. This correlation was initially developed for strongly water wet conditions and later used to assess changes in imbibition rate as a result of changes in wettability for a variety of MXW and MXW-F wetting conditions.

$$t_D = t\sqrt{\frac{k}{\phi}}\ \frac{\sigma}{\sqrt{\mu_o\mu_w}}\ \frac{1}{L_c^2}$$

where $t_D$ is dimensionless time, t is time, k is permeability, $\phi$ is porosity, $\sigma$ is the interfacial tension, and $\mu_o$ and $\mu_w$ are the oil and brine viscosities. $L_e$ is a characteristic length that compensates for sample size, shape and boundary conditions.

Imbibition data is presented as oil recovery of percentage of original oil in place (OOIP) vs. dimensionless time $t_D$ (FIGS. 9-15). An imbibition recovery curve is included as a reference for recovery from a very strongly water wet core with zero initial water saturation (Ev8 VSWW).

The fractional gas permeability, referred to as the recovered permeability, was plotted against the cumulated pore volume of the injected methane converted to standard conditions (20.0° C. and 1 atm). The reference curve for gas flooding was obtained by displacing water from VSWW cores with methane.

Wettability Alteration by Adsorption and/or Surface Precipitation of Asphaltenes for Different Asphaltic Crude Oil/Mineral Oil of Asphaltic Crude Oil/Paraffinic Crude Oil Combinations Evidence of asphaltene precipitation was first tested by visual observation of mixtures in test tubes. The volume ratio of mineral oil or paraffinic crude oil to asphaltic crude oil ranged from 40:1 to 10:1. As shown in Table 6, S220 mineral oil induced asphaltene precipitation. Furthermore, a crude oil that contained neither asphaltenes nor resins (Dakota crude oil) also caused asphaltene precipitation comparable to that observed for S220. Frontier crude oil, which contained resins but not asphaltenes, could only induce asphaltene precipitation for a high asphaltene content crude oil (Black Mountain). Comparable behavior can be expected for higher asphaltene content oils but visual observation is difficult because of increased opacity.

For the results shown in FIG. 9a, initial water saturation of about 23% was established for cores Ev8h2b, Ev8h6b, and Ev8h3a by VMO flooding followed by displacement with decalin and M'02 crude oil, in turn. The results for cores Ev8h2b and Ev8h6b demonstrated the reproducibility of wetting alteration as indicated by imbibition behavior for duplicate cores. The 10-day aging process caused distinct wettability change away from the VSWW reference. Displacement of M'02 crude oil with paraffinic Dakota oil (core Ev8h3a) resulted in almost complete suppression of imbibition. The wettability change is ascribed to surface precipitation of Asphaltenes. This behavior is equivalent to that reported for displacement of the same crude oil with mineral oil.

For the results shown in FIG. 9b, initial water saturation was established by flow of VMO for cores Ev8h5a, Ev8h5b, and Ev8h7b. Then the VMO was displaced by decalin which in turn was displaced by crude oil. These cores were not aged at elevated temperature. The crude oil was then displaced directly with S220 or Dakota crude oil. The imbibition rate of the non-aged Ev8h5a was faster by more than one order of magnitude than for the 10-day aged cores. (The result for core Ev8h2b from FIG. 9a is shown as a dashed line.) As for the VSWW reference curve, oil recovery for the non-aged Ev8h5a quickly reached a well-defined plateau. The most notable feature of the results is that even for cores that were not aged in crude oil, direct flooding of Ev8h5b by S220 mineral oil and Ev8h7b by Dakota crude oil resulted in dramatic reduction of brine imbibition. The results demonstrate that pre-adsorption from crude oil at elevated temperature (most previous tests were run this way) is not a necessary condition for drastic wettability alteration by surface precipitation. This behavior is consisted with the contact angle measurements at ambient temperature.

Additional results for non-aged cores are shown in FIG. 9c for four cores treated with Tensleep 95 crude oil. The recovery curve for Ev8h5a (treated with M'02 oil) from FIG. 9b is included in FIG. 9c as a dashed line. The result for Ev8h14a MXW (Tensleep 95, no aging) is in close agreement with that of Ev8h5a MXW (M'02). For both crude oils and no aging, their effect on imbibition behavior was relatively minor. Direct displacement of Tensleep oil with Dakota oil (core Ev8h14b) caused a large reduction in imbibition rate but much less suppression than observed for M'02 crude oil as shown in FIG. 9b.

For core Ev8h21b, Tensleep 95 crude oil was directly flushed by Frontier crude oil (This oil contains resins but without asphaltenes.) Brine imbibition rate was distinctly faster than for core Ev8h14b (Tensleep oil displaced directly by Dakota oil). Clearly, the choice of precipitant is of key importance in determining wettability alteration.

High asphaltene content is not a necessary condition for effective wettability alteration by surface precipitation. When Big Sand Draw crude (BSD), with an asphaltene content of about 1.6%, was displaced directly by pentane followed by S220 (core Ev8h28b, FIG. 1d) brine imbibition was almost completely suppressed.

It can be expected that surface precipitation can also be achieved by direct displacement of asphaltic crude oil with natural gas, especially near or above the reservoir bubble point. At this condition asphaltene precipitation is most likely because the solvency of the crude oil is at a minimum. In laboratory testing, mainly for reasons of safety and convenience, except where described otherwise, refined mineral oil (S130 or S220) was used as the precipitant and the test oil for imbibition, rather than gas or highly volatile liquids such as pentane.

Re-Exposing Asphallene Surface-Precipitated (SPA) Cores to Fresh Crude Oil

In an oil well, after wettability is altered by surface precipitation, the formation will be re-exposed to flowing crude oil. The question arises as to the effect of re-exposure to the wettability state attained by surface precipitation.

FIG. 10 shows the imbibition behavior of core Ev8h4a in which M'02 crude oil was flushed by Dakota oil followed by re-exposure to fresh M'02 crude oil. Compared to results for the MXW DF core Ev8h3a, the wettability of the Ev8h4a reverted towards that of the original MXW case (see FIG. 10), showing that surface precipitated material was removed or altered in some way by re-exposure. This effect is obviously highly adverse with respect to maintaining the established neutral wet condition.

Several approaches to this problem were tested; re-aging with the parent crude oil at elevated temperature, reduction of initial water saturation, and use of low concentration oil soluble surfactants.

Re-aging of cores with crude oil enhances the adsorption of polar components from crude oils so that the existing wettability changes towards neutral or even oil-wetness. Transition towards increased water wetness and increased oil recovery by spontaneous imbibition was observed after cores were aged at high water saturation and elevated temperature or experienced water saturation change at elevated temperature. Comparable change in towards water wetness with increased exposure to brine has been reported for a water flooded reservoir.

Distinct reduction in water wetness is observed with decrease in the connate water saturation at the time of aging. This is ascribed to the increase in fraction of rock surfaces exposure to crude oils. Various approaches can be taken to reduce the initial water saturation, for example by extended flooding with a viscous mineral oil. A viable approach to reducing water saturation in the near well bore region is to displace the connate water and oil with a liquid such as alcohol that exhibits some degree of mutual solvency.

The third possibility is to add an oil-soluble surfactant to the crude oil in order to boost and/or stabilize the wettability change resulting from adsorption from crude oil.

The Effect of Re-Exposure to Crude Oil and Re-Aging at Elevated Temperature.

After the first cycle of brine imbibition, initial water saturation of core Ev7v1b, as shown in FIG. 11a, was reestablished by flow of M'02 crude oil. A second cycle of imbibition was started without aging. Imbibition of the second cycle ran slightly faster at early time and then slowed relative to first cycle imbibition (see FIG. 11a). This behavior indicated that the wetting state of the core did not change much if the core was not re-aged at elevated temperature, even though the initial water saturation changed from 23.3% to 20.6% from first to second exposure to crude oil. In contrast, core Ev8h2b (first cycle initial water saturation of 23.7%) was re-aged for two days at elevated temperature (at 19.4% initial saturation) and exhibited significantly slower imbibition (see FIG. 11b) indicating that additional adsorption had occurred.

The Effect of Alcohol Flush

Alcohol can be used as mutual solvent to reduce water saturation. The interfacial tension between oil and ethanol is much lower than between oil and brine. For example, the IFT between S220 and ethanol is about 1.7 mN/m compared to about 50 mN/m between S220 and SSW (see Table 5). Furthermore, short chain alcohols are soluble in all proportions with brine. Thus, if water is displaced by alcohol which in turn is displaced by crude oil, an initial alcohol saturation is retained in the rock. Capillary forces of retention for the alcohol are much reduced compared to those for brine.

It has been reported that isopropyl or butyl alcohol plus methyl alcohol could be used in miscible displacement to increase oil recovery of naphtha and mineral oil. Others have investigated enhanced oil recovery by alcohol flooding. Their process design was strongly guided by the ternary phase of alcohol/oil/brine. They showed that oil recovery was highly dependent on the choice of alcohol/oil/brine combinations. Others have reported that injection of appropriate combinations of oil-soluble and water-soluble solvents such as alcohols and ketones could significantly enhance oil recovery.

In the present application work, the objective was to decrease the wetting phase saturation of a rock by injection of alcohol. At the termination of the first cycle imbibition, the water saturation had risen from 22% (the initial water saturation) to about 35%. The core Ev1v1d was then flushed with ethanol followed by M'02 crude oil. This procedure resulted in an initial ethanol saturation ($S_{Et}$) of only 6.6%. As shown in FIG. 12a, the imbibition curve for the second cycle was still close to that of the first cycle. Even though the initial wetting phase saturation had been drastically reduced, there was little, if any, change in wettability. Thus after reduction of initial wetting phase saturation it is essential that the core rock be subjected to further aging with crude oil.

FIG. 12b shows the results of two cycles of imbibition for core Ev8h1a and one cycle of imbibition for core Ev8h29a. Using the same procedure as described above for core Ev1v1d, initial ethanol saturation by M'02 flooding of 13.4% was obtained for core Ev8h1a and 18.8% for core Ev8h29a. Next, core Ev8h1a was re-aged in the M'02 crude oil for two days at 75° C. and core Ev8h29a was re-aged in the parent crude oil for four days at 45° C. Imbibition was completely suppressed for four days for Ev8h1a and three days for Ev8h29a. This result implies that, even at low reservoir temperature, strong wettability alteration away from water wetness could be achieved in the reservoir provided sufficient aging time is allowed. However, after a few weeks significant oil recovery was observed, indicating that the induced wettability changed to slightly water wetness with time as judged by imbibition rate.

Because of the possibility of asphaltene plugging, particularly for low permeability gas reservoirs, the use of a much lower asphaltene content oil than M'02 was explored. Results for cores treated with Big Sand Draw (BSD.) crude oil are shown in FIG. 12c. Injection of Big Sand Draw crude oil into a core Ev8h30a initially saturated with alcohol resulted in an initial wetting phase saturation (alcohol) of 24.7%. For core Ev8h21a which had aged with 24.5% initial water saturation prior to the first imbibition, displacement with alcohol after first imbibition followed by displacement of BSD crude oil resulted in an ethanol saturation of 4.8%. The Ev8h30a and Ev8h21a were then aged for two days at 75° C. Both cores exhibited completely suppressed imbibition for about two days but there was substantial oil recovery at later time, again indicating that wettability reverted towards weak water wetness with time.

Stability of Wetting Change by Oil-Soluble Surfactants on Sandstones

It has been reported, with regard to hydraulic fracturing, that placing non-wet rendering surfactants in methanol and proppant laden fluid could significantly increase the recovery of load water (water associated with fracture fluid) subsequent to fracturing. Others have confirmed that use of Black Magic® drilling mud (prepared by mixing asphalt with a base oil) could mitigate formation damage and aid in recovery of well productivity.

In the present application, oil soluble surfactants were directly placed in crude oil to enhance wettability alteration and stability. Direct use of crude oil costs much less than using manufactured oils and mitigates the possibility of more water block caused by using water-based fluid in any treatments.

Surfactant Screening

A series of oil-soluble surfactants was screened for their ability to render rock surfaces neutral or oil-wet. Five types of surfactant solutions were prepared with S220 as the base oil. Wettability alteration was assessed by imbibition tests (FIG. 13a). The cores were first flooded with VMO to approximately 22.5% initial water saturation. The VMO was then flushed with a solution of surfactant in S220. Results of imbibition tests for the five surfactants are shown in FIG. 13a. Overall, Polyamine PA gave the greatest and most stable wettability alteration. Theoretically, oleic acid can adsorb on rock surfaces by adjusting ionic calcium concentration in brine to force the formation of calcium oleate precipitation; however, the result of wettability alteration by this means was not efficient because of the difficulty of pH control. The tested polyamine RAP was less effective because of emulsification. Both of the tested nonionic surfactants, TDA-6 and TD-4, had no significant effect on wettability.

Solutions of Surfactant in Crude Oil

Comparison of imbibition behavior with and without the addition of polyamine PA to Dakota crude oil (a highly paraffinic oil that contains neither asphaltenes nor resins) is shown in FIG. 13b. Without the addition of polyamine PA and aging, the imbibition behavior of core Ev8h8a closely matched the recovery of a highly asphaltic crude oil (M'02) from core Ev8h5a (see FIG. 9b). This result implies that very little adsorption of asphaltenes or resins occurred from the M'02 oil prior to aging. Comparable behavior was observed for the Tensleep oil (see FIG. 9c). However, for comparable initial water saturations, in all cases the recovery of crude oil was about 3% less than for clean mineral oil. With addition of 0.025% polyamine PA to the Dakota oil (core Ev8h11b, no aging) imbibition rate and oil recovery were both significantly reduced, indicating wettability alteration by adsorption of the PA surfactant.

For 0.025% PA solution in M'02 crude oil (core Ev8h13a, no aging) oil recovery and imbibition rate were much reduced compared to the no-aging reference curve for M'02 (see FIG. 13c) and also compared to the result for Dakota oil plus PA surfactant (cf. FIGS. 13b and 13c). The presence of asphaltenes and resins in the M'02 oil boosted the wettability alteration resulting from the presence of the PA surfactant. When aging at elevated temperature for 10 days, (Ev8h16b) further wettability change toward neutral wetness occurred (FIG. 13d) compared to that for Ev8h13a (FIG. 13c), because of the synergetic effect of the PA surfactant and asphaltene on wettability alteration.

Imbibition recovery of BSD crude oil plus PA surfactant without aging is shown in FIG. 13e for core Ev8h27b. Recovery rate was reduced by about an order of magnitude compared to that for the MXW reference core Ev8h28, but was still well above the MXW DF reference curve.

For Ev8h30b, water was first displaced from the core by flushing with ethanol which was in turn displaced by BSD crude oil plus 0.1% PA. The core was aged for two days at elevated temperature. Imbibition was completely suppressed (FIG. 13f). It is likely that reduction of the initial alcohol saturation by surfactant aided solubilization of alcohol into the oil phase during aging at elevated temperature contributed to the observed wettability alteration. Ev8h30b was then set in an oven at 75° C. in order to test the stability of wettability alteration to elevated temperature. Imbibition recovery merely became close to that measured for Ev8h27b. Thus the wettability alteration away from water wetness was still much greater than that for the MXW reference core.

It is concluded that the procedure of removal of water by alcohol flush followed by injection of crude oil plus PA surfactant results in a stable induced wettability state that is highly beneficial with respect to solving the problem of water blocks in sandstones in the vicinity of a well bore.

Stability of Wetting Change by Oil-Soluble Surfactants on Carbonates

The effect of oil soluble surfactants on wettability alteration was also investigated for carbonates. FIG. 14 shows a reference curve for VSWW limestone together with results for imbibition of brine in core 1TC15a (cottonwood crude oil). T2TC11a and T2TC21a (cottonwood crude oil plus 0.1% PA). Core 1TC15a was aged in Cottonwood crude oil for 10 days at 75° C. (at initial water saturation 24.3%) while T2TC1a and T2TC21a were aged in Cottonwood crude oil plus 0.1% PA in the same way. Imbibition behavior of core 1TC15a is comparable with the results of foregoing cores such as Ev8h2b (FIG. 1a, M'02) and Ev8h13b (FIG. 9c, Tensleep). However, imbibition of T2TC11a and T2TC21a (see FIG. 14) was completely suppressed. This further demonstrates the synergetic effect of PA surfactant and asphaltene on wettability alteration.

In summary, the above results are highly promising with respect to removal of water blocks from limestone oil or gas reservoirs.

Effect of Wettability Alteration on Gas Production

Many economically productive gas reservoirs have much lower permeability than oil reservoirs. There has been growing interest in gas production from massive tight (low permeability) reservoirs over the past 30 years. Water block in tight gas reservoirs is widely recognized as a serious problem. Various drilling and production techniques have been employed, such as injection of alcohol to mitigate the problem of water block. Displacement of the water block plus alteration of wettability to neutral or oil wetness provides a viable approach to increased gas production. The approach used in the present application involves injection of a solvent for water followed by injection of crude oil either with or without oil soluble surfactant in order to change the wettability around the well bore and, for naturally or artificially fractured reservoirs, at fracture faces.

For gas reservoirs the crude oil can be chosen such that the reservoir gas serves as a precipitant. Choice of oil is also guided by the need to avoid significant loss of permeability by asphaltene plugging. In laboratory testing, mineral oil was used as the surface precipitant.

Reference curves for recovered permeability to methane (expressed as a fraction of absolute permeability) at ambient temperature are included in FIG. 15a for VSWW limestone (1TC20b, 1TC8b, and 3TC18b with permeabilities of 6.1 md, 3.7 md, and 1.4 md respectively). The recovered permeabilities ranged from 5% to 11%. Core 2TC04b was aged in Tensleep crude oil at an initial water saturation of 21.7% and elevated temperature. The Tensleep crude oil was then displaced directly by S130. The recovered permeabilities were much higher (about 40% after injection of 850 PV of gas with a continued trend of increase in recovered permeability) than for the VSWW reference cores. At the end of the first cycle of flooding, 2TC04b was immersed in SSW to simulate the process of water re-invasion. Increase in water saturation was monitored gravimetrically until imbibition of brine became extremely slow (after about two to three days). The core was then re-flooded with gas. The recovered permeability was about 26% after 650 PV of gas had been injected. The recovered permeability was lower than that for the first cycle of gas flooding but well above the reference curves. This demonstrates that wettability alteration by surface precipitation will benefit gas production. Recovered gas permeabilities can be expected to be higher at reservoir conditions of elevated temperature and pressure if oil is displaced because of reduced capillary forces and/or removed by evaporation.

For core 2TC04a ($S_{wi}$ 22.6%), after two days aging and direct displacement of BSD crude oil by S130, the recovered permeability was 49% and still on an increasing trend after about 1000 PV gas had been injected (FIG. 15b). After spontaneous imbibition of brine, the second cycle of methane flooding gave about 39% of recovered gas permeability after injection of 900 PV of gas.

The results of recovered permeability for treated core 1TC04b are shown in FIG. 15c. When the core was simply flooded with BSD crude oil to establish $S_{wi}$ (about 27.5%), but with no aging step, the recovered permeability showed no improvement, being 11% after injection of 235 PV methane. When 0.1% polyamine PA was added to the BSD oil, after injection of 220 PV gas, the recovered permeability increased to about 27%. After the core was exposed to brine invasion, the recovered permeability was about 25% at injection of 340 PV gas.

FIG. 15d shows the recovered gas permeability of core 3TC20b. The core was first saturated with brine and then flushed with ethanol followed by the BSD crude oil plus 0.1% PA. An initial wetting phase saturation of 21.0% was established. The core was then aged for two days at 75° C. and then flooded with methane. The recovered gas permeability was 26% after 670 PV gas injection. The recovered permeability of 3TC20b (1.8 md versus about 3 md for the other cores) was comparatively low, probably because of increased retention of oil by capillary forces.

The foregoing exemplary descriptions and the illustrative preferred embodiments of the present invention have been explained in the drawings and described in detail, with varying modifications and alternative embodiments being taught. While the invention has been so shown, described and illustrated, it should be understood by those skilled in the art that equivalent changes in form and detail may be made therein without departing from the true spirit and scope of the invention, and that the scope of the present invention is to be limited only to the claims except as precluded by the prior art. Moreover, the invention as disclosed herein, may be suitably practiced in the absence of the specific elements which are disclosed herein.

TABLE 1

The Berea sandstone core properties

| Core # | D, cm | L, cm | $K_g$, md | $\Phi$, % | $S_{wi}$, % | $\mu_{O2}$ cp | Wetness |
|---|---|---|---|---|---|---|---|
| | | | Soltrol 220, no aging | | | | |
| Ev8h8b | 3.764 | 7.91 | 73.9 | 0.1615 | 22.6 | 3.8 | VSWW |
| Ev8h9a | 3.739 | 8.057 | 82.9 | 0.1601 | 20.9 | 3.8 | VSWW |
| Ev8h9b | 3.742 | 7.922 | 76.7 | 0.1588 | 24.6 | 3.8 | VSWW |
| Ev8h10a | 3.761 | 8.047 | 76.7 | 0.1636 | 22.7 | 3.8 | VSWW |

TABLE 1-continued

The Berea sandstone core properties

| Core # | D, cm | L, cm | $K_g$, md | Φ, % | $S_{wi}$, % | $\mu_{O2}$ cp | Wetness |
|---|---|---|---|---|---|---|---|
| Ev8h10b | 3.764 | 7.83 | 70.1 | 0.1627 | 22.5 | 3.8 | VSWW |
| Ev8h17a | 3.763 | 8.245 | 77.4 | 0.1734 | 22.59 | 3.8 | VSWW |
| Ev8h18a | 3.753 | 7.894 | 95.8 | 0.1746 | 23.02 | 3.8 | VSWW |
| *Minnelusa 2002 crude oil* | | | | | | | |
| Ev8h1a | 7.864 | 3.786 | 101.5 | 0.1760 | 23.9 | 68.0 | MXW, 10d aging |
| Ev8h2b | 7.538 | 3.765 | 71.7 | 0.1652 | 23.7 | 68.0 | MXW, 10d aging |
| Ev8h3a | 3.764 | 7.963 | 70.1 | 0.1678 | 24.3 | 1.5 | MXW-F (Dakota), 10d aging |
| Ev8h4a | 3.764 | 8.06 | 65.1 | 0.1636 | 24.3 | 68.0 | MXW, 10d aging |
| Ev8h4b | 7.680 | 3.767 | 66.6 | 0.1628 | 24.6 | 680 | MXW, 1d aging |
| Ev8h5a | 8.242 | 3.764 | 68.2 | 0.1649 | 24.6 | 68.0 | MXW, no aging |
| Ev8h5b | 3.766 | 7.754 | 74.6 | 0.1664 | 24.4 | 3.8 | MXW-F (S220), no aging |
| Ev8h6b | 7.736 | 3.764 | 67.6 | 0.1605 | 22.0 | 68.0 | MXW, no aging |
| Ev8h7b | 3.765 | 7.67 | 72.4 | 0.1603 | 22.5 | 1.5 | MXW-F (Dakota), no aging |
| Ev8h11b | 3.758 | 7.791 | 120 | 0.1743 | 22.8 | 1.5 | MXW (Dakota), no aging |
| Ev8h13a | 3.758 | 8.105 | 126.2 | 0.1754 | 23.2 | 68.0 | MXW, no aging |
| Ev8h16a | 8.280 | 3.759 | 114.0 | 0.1778 | 22.1 | 68.0 | MXW, 10d aging |
| Ev8h16b | 3.76 | 7.921 | 117.2 | 0.1774 | 21.3 | 68.0 | MXW, 10d aging |
| Ev8h29a | 3.75 | 8.262 | 133.1 | 0.1749 | 18.8 | 68.0 | MXW, 4d aging, 45° C. |
| Ev7v1b | 7.644 | 3.788 | 58.2 | 0.1748 | 23.3 | 68.0 | MXW, 10d aging |
| Ev1v1d | 3.777 | 7.581 | 46.2 | 0.1703 | 22.0 | 68.0 | MXW, 10d aging |
| Ev5h1c | 3.787 | 7.634 | 113 | 0.182 | 23.9 | 68.0 | MXW, 10d aging |
| *Tensleep 95 crude oil* | | | | | | | |
| Ev8h13b | 3.758 | 7.835 | 119.3 | 0.1731 | 21.3 | 19.2 | MXW, 10d aging |
| Ev8h14a | 3.759 | 8.076 | 109.6 | 0.1717 | 22.6 | 19.2 | MXW, no aging |
| Ev8h14b | 3.76 | 7.839 | 106.2 | 0.1708 | 22.0 | 1.5 | MXW-F (Dakota), no aging |
| Ev8h15a | 3.757 | 8.228 | 111.1 | 0.1778 | 22.2 | 1.5 | MXW-F (Dakota), no aging |
| Ev8h15b | 3.759 | 7.974 | 114.4 | 0.1776 | 22.7 | 19.2 | MXW, no aging |
| Ev8h21b | 3.758 | 7.686 | 87.6 | 0.174 | 22.6 | 33.9 | MXW-F (frontier), no aging |
| *Big Sand Draw crude oil* | | | | | | | |
| Ev8h19a | 3.756 | 7.866 | 70.9 | 0.1698 | 23.1 | 3.8 | MXW-F (S220), no aging |
| Ev8h21a | 3.758 | 7.832 | 84.8 | 0.1724 | 23.3 | 7.0 | MXW, no aging |
| Ev8h27b | 3.750 | 7.758 | 119.7 | 0.1741 | 23.6 | 7.0 | MXW, no aging |
| Ev8h28b | 3.750 | 8.056 | 121.2 | 0.1794 | 22.3 | 7.0 | MXW, 10d aging |
| Ev8h30a | 3.748 | 7.597 | 86.8 | 0.1705 | <24.7 | 7.0 | MXW, 2d aging |
| Ev8h30b | 3.752 | 7.153 | 86 | 0.1717 | <26.3 | 7.0 | MXW, 2d aging |

TABLE 2

The Limestone core properties

| Core # | D, cm | L, cm | $K_g$, md | φ, % | $S_{wi}$, % | $\mu_o$, cp | Wetness |
|---|---|---|---|---|---|---|---|
| *Oil recovery (Cottonwood oil)* | | | | | | | |
| 1TC15a | 3.724 | 7.477 | 19.1 | 0.2696 | 24.3 | 24.1 | MXW, 10d aging |
| T2Tc11a | 3.729 | 7.320 | 14.7 | 0.2767 | 18.59 | 24.1 | MXW, 10d aging |
| T2Tc21a | 3.698 | 7.797 | 7.1 | 0.2300 | 22.12 | 24.1 | MXW, 10d aging |
| *Gas flooding* | | | | | | | |
| 1TC8b | 3.734 | 6.59 | 3.7 | 18.0 | 100 | | VSWW |
| 1TC20b | 3.749 | 7.452 | 6.1 | 21.6 | 100 | | VSWW |
| 1TC24b | 3.753 | 7.593 | 3.6 | 18.0 | 100 | | VSWW |
| 3TC18b | 3.740 | 6.490 | 1.4 | 20.2 | 21.4 | | VSWW |
| 2TC4b | 3.788 | 6.481 | 3.4 | 22.8 | 21.7 | | Tensleep/S130, 2d aging |
| 1TC24b | 3.753 | 7.593 | 3.6 | 18.0 | 27.5 | | BS oil (the $2^{nd}$ and $3^{rd}$ cycle), 2d aging |

TABLE 3

Selected properties of crude and refined oils

| | Oils | ρ, g/mL @ 20° C. | η, cP @ ~22° C. | IFT, mN/M @ 20° C. | Asphalt. % |
|---|---|---|---|---|---|
| Asphaltic crudes | Minnelusa 2002 | 0.9076 | 68 | 23.4 | 9.5 |
| | Black Mt. | 0.9219 | 134 | | 8.1 |
| | Tensleep 95 | 0.8692 | 19.2 | 23.3 | 3.2 |
| | Cottonwood | 0.8874 | 24.1 | 28.9 | 2.3 |
| | Big Sand Draw | 0.8496 | 7.0 | 21.5 | 1.6 |
| Mineral oils | S220 | 0.7869 | 3.8 | 49.5 | 0 |
| | S130 | 0.7605 | 1.6 | ~50 | 0 |

TABLE 3-continued

Selected properties of crude and refined oils

|  | Oils | ρ, g/mL @ 20° C. | η, cP @ ~22° C. | IFT, mN/M @ 20° C. | Asphalt. % |
|---|---|---|---|---|---|
|  | Pentane |  |  | ~50 | 0 |
| Paraffinic | Dakota | 0.7741 | 1.5 | 34.2 | 0 |
| crudes | Frontier | 0.8338 | 21.8 | 33.8 | 0 |

TABLE 4

Synthetic brine composition

| Brine | NaCl (g/L) | KCl (g/L) | CaCl$_2$ (g/L) | MgCl$_2$ (g/L) | NaN$_3$ (g/L) | pH | TDS (mg/L) |
|---|---|---|---|---|---|---|---|
| Sea water | 28 | 0.935 | 2.379 | 5.365 | 0.1 | 6.6 | 36779 |

TABLE 5

Interfacial tensions (Aqueous phase = SSW)

| Oleic phase | IFT, mN/m | Temp., ° C. |
|---|---|---|
| S220 | 49.5 | 20.0 |
| S220 | 1.7 | 20.0 |
| S220 + 0.025% polyamine | 24.3 | 20.0 |
| S220 + 0.2% RAP | 0.03 | 20.0 |
| S220 + 0.05% RAP | 0.55 | 20.0 |
| S220 + 0.025% PA + 0.05% RAP | 1.0 | 20.0 |
| S220 + 0.2% TDA-6 | 1.34 | 20.0 |
| S220 + 0.1% DA-4 | 11.7 | 20.0 |
| S220 + 0.1% oleic acid | 29.8 | 20.0 |
| Minnelusa 2002 crude oil | 23.4 | 20.0 |
| Dakota crude oil | 34.2 | 20.0 |
| Tensleep 1995 crude oil | 23.3 | 20.0 |
| Big SandDraw crude oil | 21.5 | 20.0 |
| Frontier crude oil | 33.8 | 20.0 |
| M'02 + 0.025% PA | 17.7 | 20.0 |
| M'02 + 0.05% RAP | 8.6 | 20.0 |
| Dakota oil + 0.025% PA | 7.9 | 20.0 |
| Tensleep 95 + 0.05% PA | 10.5 | 20.0 |
| BS oil + 0.05% PA | 10 | 20.0 |
| BS oil + 0.1% PA | 7.2 | 20.0 |
| BS oil + 0.1% PA | 4.3 | 75.0 |
| Cottonwood oil + 0.025% PA | 12.1 | 20.0 |
| Cottonwood oil | 28.9 | 20.0 |

TABLE 6

Asphaltene precipitation

|  | Minnelusa crude | Black Mountain crude | Tensleep crude | Big Sand Draw |
|---|---|---|---|---|
| S220 or S130 | Yes | Yes | Yes | Yes |
| Dakota oil | Yes | Yes | Yes | Yes |
| Frontier oil |  | Yes (under microscope) | No | No |

What is claimed is:

1. A method for reducing or eliminating water block around a well bore of a well bore region in a reservoir, the method comprising:
   removing the water from around the well bore;
   injecting crude oil around the well bore; and
   injecting precipitants causing surface precipitation of asphaltenes thereby altering formation wettability in the well bore and decreasing capillary forces of retention for water and/or gas condensates and increasing the flow of hydrocarbon fluids from the reservoir.

2. The method of claim 1 wherein the precipitants are aliphatic hydrocarbons.

3. The method of claim 2 wherein the aliphatic hydrocarbon comprises predominantly aliphatic refined mineral oil.

4. The method of claim 1 wherein reservoirs are selected from the group consisting of oil reservoirs, gas reservoirs, and gas storage reservoirs and the hydrocarbon fluids are selected from the group consisting of crude oil and natural gases.

5. The method of claim 1 and further comprising:
   injecting brine co-solvent around the well bore.

6. The method of claim 5 and further comprising:
   injecting the brine co-solvent to a range of between approximately two (2) feet and approximately ten (10) feet from the well bore.

7. The method of claim 5 wherein the brine co-solvent is an alcohol selected from the group consisting of methanol, ethanol, iso-proponol, and butanol.

8. The method of claim 5 wherein the co-solvent is tetrahydrofuran.

9. The method of claim 5 wherein the brine co-solvent is a micellar surfactant solution of an alcohol or other co-solvent.

10. The method of claim 1 wherein the crude oil used for injecting has wettability alteration properties including surface precipitation onto the mineral surfaces in the well bore region.

11. The method of claim 1 wherein the reservoir is a gas reservoir, and further comprising:
   allowing gas or hydrocarbon condensates to interact with the crude oil causing surface precipitation of asphaltenes in the well bore region.

12. The method of claim 1 and further comprising:
   repeating the removing of water by injecting crude oil two or more limes thereby maintaining altered wettability of the well bore region and reducing water saturation in the well bore region.

13. The method of claim 1 wherein the well bore region is selected from the group consisting of perforated regions, open holes, and faces of hydraulic fractures.

14. The method of claim 1 wherein change in the wettability is to a weakly water wet form.

15. The method of claim 1 wherein the change in the wettability is to a neutral wet form.

16. The method of claim 1 wherein the change in the wettability to an oil wet form.

17. The method of claim 1 wherein the change in the wettability includes degrees of wetting between weakly water wet and oil wet.

18. The method of claim 1 and further comprising:
   adding a low concentration of an oil soluble surfactant for promoting the wettability and to enhance wettability alteration in the well bore region.

19. The method of claim 18 wherein the oil soluble surfactants are nitrogen derivatives selected from the group consisting of amines and polyamines.

20. The method of claim 18 and further comprising:
   adding surfactants in an oleic phase for reducing the interfacial tension between oil and water phases and decreasing the operational pressure drop required to displace water.

21. The method of claim 1 wherein the crude oil or combination of crude oils used for injection into gas condensate reservoir or oil reservoir is selected by asphaltene content, surface adsorption, and precipitation characteristics.

22. The method of claim 1 wherein lower asphaltene-content oil is used for gas, condensate, or oil reservoirs with low permeability thereby minimizing plugging of the formation by asphaltene deposition.

23. The method of claim 1 and further comprising:
adding precipitants prior to injection thereby adjusting the composition of a crude oil and changing the solvent properties with respect to adsorption or surface precipitation.

24. The method of claim 23 wherein the precipitants are selected from the group consisting of an alkane and aliphatic crude oil.

25. The method of claim 24 wherein the aliphatic hydrocarbon comprises a paraffinic crude oil being free from asphaltene.

26. The method of claim 1 and further comprising:
treating gas storage reservoir to promote the efficiency of gas charge or discharge.

27. The method of claim 1 and further comprising:
assessing the wettability alteration by forced and spontaneous imbibitions tests.

28. The method of claim 1 wherein decreasing the water wetness of mineral surfaces in the well bore region can be achieved by using water-based muds.

* * * * *